(12) United States Patent
Kim et al.

(10) Patent No.: US 10,732,805 B2
(45) Date of Patent: Aug. 4, 2020

(54) ELECTRONIC DEVICE AND METHOD FOR DETERMINING A SELECTION AREA BASED ON PRESSURE INPUT OF TOUCH

(71) Applicant: Samsung Electronics Co., Ltd., Gyeonggi-do (KR)

(72) Inventors: So Young Kim, Gyeonggi-do (KR); Kyu Hong Kim, Gyeonggi-do (KR); Seung Min Choi, Gyeonggi-do (KR); Yo Han Lee, Gyeonggi-do (KR); Yong Joon Jeon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 190 days.

(21) Appl. No.: 15/657,702

(22) Filed: Jul. 24, 2017

(65) Prior Publication Data

US 2018/0046359 A1 Feb. 15, 2018

(30) Foreign Application Priority Data

Aug. 12, 2016 (KR) .................. 10-2016-0102715

(51) Int. Cl.
*G06F 3/041* (2006.01)
*G06F 3/0484* (2013.01)
(Continued)

(52) U.S. Cl.
CPC ........ *G06F 3/04842* (2013.01); *G06F 3/0414* (2013.01); *G06F 3/0488* (2013.01);
(Continued)

(58) Field of Classification Search
CPC .. G06F 3/04842; G06F 3/0414; G06F 3/0488; G06F 2203/04106; G06F 16/903; G06F 2203/04808
See application file for complete search history.

(56) References Cited

U.S. PATENT DOCUMENTS

| 8,760,408 B2 * | 6/2014 | Heesemans ........... G06F 3/0414 178/19.04 |
| 2008/0204427 A1 | 8/2008 | Hessemans et al. |

(Continued)

FOREIGN PATENT DOCUMENTS

| KR | 10-2012-0020005 A | 3/2012 |
| KR | 20120020005 | * 3/2012 ............... H04B 1/40 |

*Primary Examiner* — Jonathan A Boyd
(74) *Attorney, Agent, or Firm* — Cha & Reiter, LLC.

(57) ABSTRACT

An electronic device includes a display; a touch sensor configured to detect at least one position of a touch by an external object on the display; a pressure sensor configured to detect pressure by the external object against the display; at least one processor electrically connected with the display, the touch sensor, and the pressure sensor; and memory electrically connected with the processor, wherein the memory stores a plurality of executable instructions, when executed, cause the at least one processor to: present a user interface containing content on the display; receive, from the touch sensor and the pressure sensor, indicators of the position and pressure of the external object pressing the display; determine a primary position on the content, based at least in part on the position of the touch; determine a selection area on the content that includes the primary position, based at least in part on the pressure; and display an indication of the selection area over the content.

17 Claims, 22 Drawing Sheets

(51) Int. Cl.
 *G06F 3/0488* (2013.01)
 *G06F 16/903* (2019.01)
(52) U.S. Cl.
 CPC .. *G06F 16/903* (2019.01); *G06F 2203/04106* (2013.01); *G06F 2203/04808* (2013.01)

(56) References Cited

U.S. PATENT DOCUMENTS

2015/0058723 A1 2/2015 Cieplinski et al.
2017/0090725 A1* 3/2017 Jansky ................ G06F 3/04842

* cited by examiner

ELECTRONIC DEVICE AND METHOD FOR DETERMINING A SELECTION AREA BASED ON PRESSURE INPUT OF TOUCH

CLAIM OF PRIORITY

This application claims the benefit under 35 U.S.C. § 119(a) of a Korean patent application filed on Aug. 12, 2016 in the Korean Intellectual Property Office and assigned Serial number 10-2016-0102715, the entire disclosure of which is hereby incorporated by reference.

TECHNICAL FIELD

This disclosure relates to an electronic device and a method for determining a selection area based on the pressure of an input touch.

BACKGROUND

With the development of mobile communication technologies, an electronic device, which is equipped with a display, such as a smartphone, a wearable device, or the like has been widely supplied since the spread of personal computers.

A display of the electronic device may be implemented with a touchscreen display. The touchscreen display may perform a role as an input device that receives a manipulation from a user, in addition to a role as a display device.

Other shortcomings of conventional approaches will become apparent through comparison of such systems with the present disclosure.

SUMMARY

To control the electronic device, the user may provide the electronic device with a user input such as a touch or the like. The user has to have sufficient confidence that an operation of the electronic device will be performed in response to a user input before providing the user input to the electronic device. Additionally, there may be a learning curve for the user to attain confidence with the types of user inputs and responses of the electronic device to the user inputs.

The pressure of a touch on a touch screen may be used as one parameter of a user input. The user may selectively input a normal touch input (e.g., a tap) and a pressure input (or a "force touch"). In the case where an input source of the user making use of a touch includes not one input source but a plurality of input sources, the amount of learning required for the user may increase more and more.

Aspects of this disclosure may address at least the above-mentioned problems and/or disadvantages and to provide at least the advantages described below. Accordingly, an aspect of this disclosure is to provide an intuitive user interface (UI) or user experience (UX) capable of minimizing learning required for a user upon controlling an electronic device in which a user makes use of a simple touch input and a pressure input of a touch together as a touch input.

Embodiments of this disclosure may include a pressure sensor capable of detecting pressure of a touch against the touch screen and may provide a method for determining a selection area in response to the pressure of the touch and an electronic device performing the same.

In accordance with an aspect of the present disclosure, an electronic device includes a display; a touch sensor configured to detect at least one position of a touch by an external object on the display; a pressure sensor configured to detect pressure by the external object against the display; at least one processor electrically connected with the display, the touch sensor, and the pressure sensor; and memory electrically connected with the processor, wherein the memory stores a plurality of executable instructions, when executed, cause the at least one processor to: present a user interface containing content on the display; receive, from the touch sensor and the pressure sensor, indicators of the position and pressure of the external object pressing the display; determine a primary position on the content, based at least in part on the position of the touch; determine a selection area on the content that includes the primary position, based at least in part on the pressure; and display an indication of the selection area over the content.

In accordance with an aspect of the present disclosure, an electronic device includes a display, a touch sensor, a pressure sensor, at least one processor electrically connected with the display, the touch sensor, and the pressure sensor; and memory electrically connected with the at least one processor, wherein the memory stores instructions that, when executed, cause the processor to detect a first touch by an external object from the touch sensor; detect pressure of the first touch from the pressure sensor; output, on the display, a selection area including a position where the first touch is made, when the pressure of the first touch is detected as being higher than a first level, expand or contract the selection area in response to pressure fluctuation of the first touch; and fix the selection area when a specified event is detected.

In accordance with another aspect of this disclosure, a method for determining a selection area may include launching an application program displaying a user interface, displaying at least one content on the user interface, receiving data on a position of an external object pressing the display and data on pressure, determining a primary position and/or a secondary position on the content based at least partly on the data on the position of the external object, determining a selection region including the primary position and/or the secondary position based at least partly on the data on the pressure by the external object, and displaying the selection region and an indication of the primary position and/or the second position, on the display.

In accordance with another aspect of this disclosure, a method for determining a selection area may include sensing a first touch by an external object by using a touch sensor, detecting pressure of the first touch by using a pressure sensor, displaying, in a display, a selection area including a position where the first touch is made, if the pressure of the first touch is detected as being higher than a first pressure level, expanding or contracting the selection area in response to pressure fluctuations of the first touch, and fixing the selection area if the expansion or contraction of the selection area stops during a specified time or more or if the selection are is contracted at a specified time change rate or more.

In accordance with an aspect of the present disclosure, a computer-readable recording medium stores instructions that, when executed by at least one processor, cause the at least one processor to: detect a first touch by an external object from a touch sensor; detect pressure of the first touch from a pressure sensor; display, on a display, a selection area including a position where the first touch is made, when the pressure of the first touch is detected as being higher than a first pressure level; expand or contract the selection area in response to pressure fluctuations of the first touch; and fix the selection area when a specified event is detected.

In accordance with another aspect of this disclosure, a computer-readable recording medium may store instructions that, when executed by at least one processor, cause the processor to sense a first touch by an external object by using a touch sensor, to detect pressure of the first touch by using a pressure sensor, to display, in a display, a selection area including a position where the first touch is made, if the pressure of the first touch is detected as being higher than a first pressure level, to expand or contract the selection area in response to pressure fluctuations of the first touch, and to fix the selection area if the expansion or contraction of the selection area stops during a specified time or more or if the selection are is contracted at a specified time change rate or more.

Other aspects, advantages, and salient features of the disclosure will become apparent to those skilled in the art from the following detailed description, which, taken in conjunction with the annexed drawings, discloses various embodiments of this disclosure.

BRIEF DESCRIPTION OF THE DRAWINGS

The above and other aspects, features, and advantages of certain embodiments of this disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
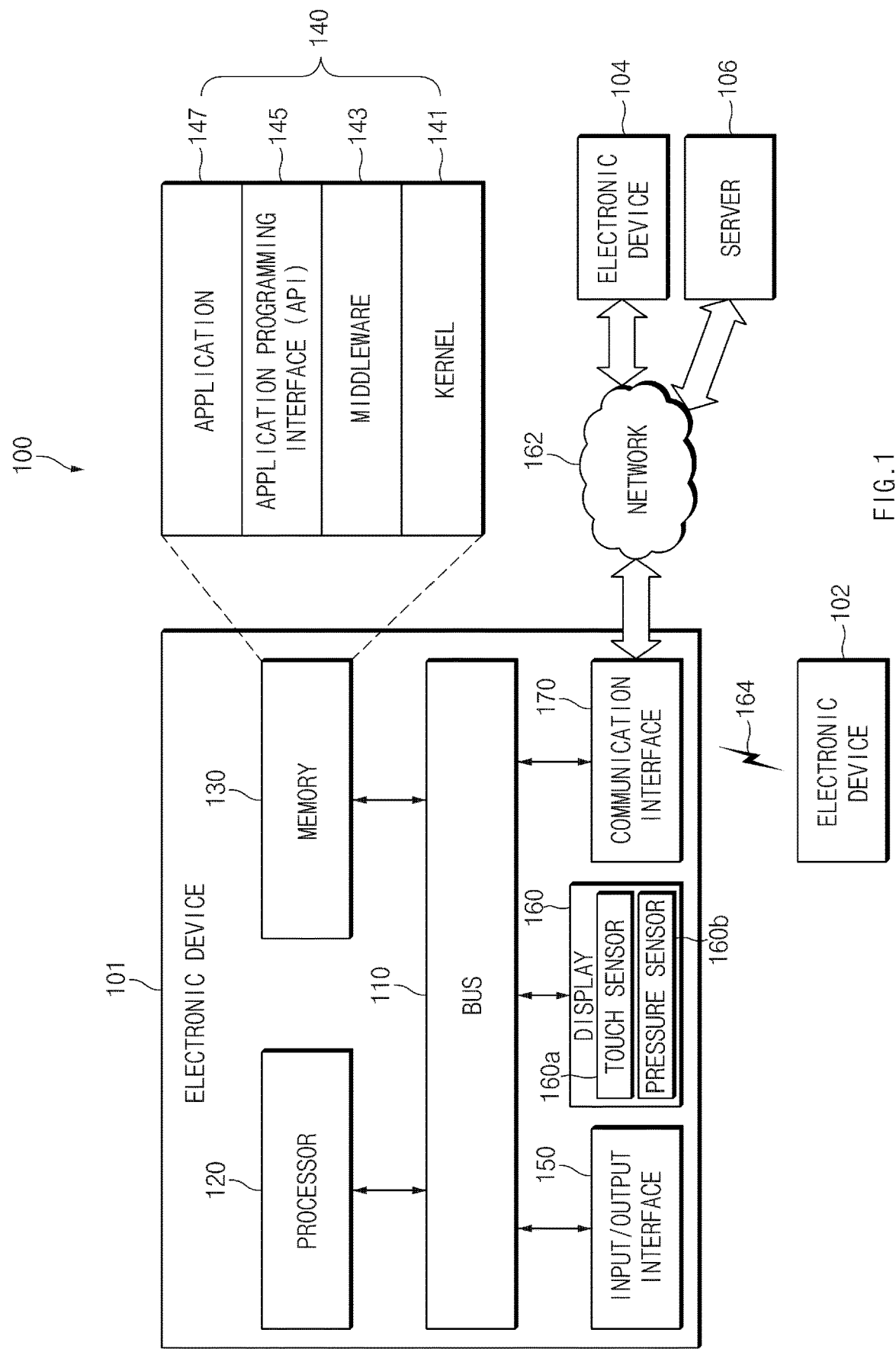
FIG. 1 illustrates an electronic device according to various embodiments.

Hereinafter, various embodiments of this disclosure will be described with reference to accompanying drawings. Accordingly, those skilled in the art will recognize that modification, equivalent, and/or alternative on the various embodiments described herein can be variously made without departing from the scope and spirit of this disclosure. With regard to description of drawings, similar elements may be marked by similar reference numerals.

In this disclosure, the expressions "have", "may have", "include" and "comprise", or "may include" and "may comprise" indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or the priority. For example, without departing the scope of this disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

The term "substantially" shall also include within, e.g., 2% of the claimed relationship. The term "touch" shall include direct touching as well as touching through covering of an underlying element, such as but not limited to protective covering, that is sufficiently thin or flexible that the pressure of the touch against the protective covering at least mechanically sensed by the underlying element.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by those skilled in the art. It will be further understood that terms, which are defined in a dictionary and commonly used, should also be interpreted as being customary in the relevant art and not in an idealized or overly formal unless expressly so defined in various embodiments of this disclosure. In some cases, even if certain terms are defined in this disclosure, they may not be interpreted to exclude embodiments of this disclosure.

An electronic device according to various embodiments of this disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, and Google TV™), game consoles (e.g., Xbox™ and PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates a block diagram of an electronic device, according to various embodiments.

The electronic device can include a display 160, touch sensor 160a, and a pressure sensor 160b. The display 160 can display various content, including a user interface. The touch sensor 160a detects a touch and the touch position on the surface of the display by an external object, such as a finger or stylus. The pressure sensor 160b detects the pressure of the touch by the external object against the display 160. Based at least in part on the touch position and pressure, the display overlays an indication of a primary touch position and a selection area over the content.

In certain embodiments, at least one processor 120 can be electrically connected to the display 160, touch sensor 160a, and pressure sensor 160b. Additionally, memory 130 can be electrically connected to the at least one processor 120 that stores instructions that are executable by the one or more processors 120. The memory 130 can include instructions that when executed by the processor cause the processor to, among other things, cause the display to present a user interface containing content on the display, receiving from the touch sensor and the pressure sensor, data indicating the position and pressure of the external object on the display, and determine a selection area of the content that includes the primary position of the touch, based at least in part on the pressure, and display the selection area on the display.

The electronic device 101, 102, or 104 or a server 106 may be connected with each other over a network 162 or a short range communication 164. The electronic device 101 may include a bus 110, the at least one processor 120, the memory 130, an input/output interface 150, the display 160, and a communication interface 170. According to an embodiment, the electronic device 101 may not include at least one of the above-described elements or may further include other element(s).

For example, the bus 110 may interconnect the above-described elements 110 to 170 and may include a circuit for conveying communications (e.g., a control message and/or data) among the above-described elements. For example, as noted above, the display 160, touch sensor 160a, pressure sensor 160b, at least one processor 120, and memory 130 can be interconnected by the bus 110.

The at least one processor 120 may include one or more of a central processing unit (CPU), an application processor (AP), or a communication processor (CP). For example, the processor 120 may perform an arithmetic operation or data processing associated with control and/or communication of at least one other element(s) of the electronic device 101.

The memory 130 may include a volatile and/or nonvolatile memory. For example, the memory 130 may store instructions or data associated with at least one other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)". In certain embodiments, the operating system (OS) can receive input from the touch and pressure sensors 160a, 160b. Based at least in part on the inputs from the touch and pressure sensors 160a, 160b, the OS can determine a selection area with a primary point based on the input of the touch sensor 160a, and the size of the selection area based on the pressure sensor 160b. An application program 147 can display a user interface with content, such as a map or image. The selection area can be overlaid onto the map or image from the application program 147.

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits an instruction or data input from a user or another external device, to other element(s) of the electronic device 101. Furthermore, the input/output interface 150 may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

As noted above, the display 160 can display a user interface containing content such as a map or an image based on an application program 147. Responsive to a touch, the display 160 can display a selection area that contains the position of the touch. The size of the selection area can be based at least in part on the amount of pressure of the touch. The position of the touch can be detected by the touch sensor 160a and the pressure of the touch can be measured by a pressure sensor 160b.

The communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may include cellular communication employing at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. According to an embodiment, the wireless communication may include, for example, at least one of wireless fidelity (Wi-Fi), Bluetooth, near field communication (NFC), magnetic stripe transmission (MST), radio frequency (RF), a body area network (BAN), and a global navigation satellite system (GNSS).

The MST may generate a pulse in response to transmission data using an electromagnetic signal, and the pulse may generate a magnetic field signal. The electronic device 101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (Beidou), or an European global satellite-based navigation system (Galileo) based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. According to an embodiment, the server 106 may include a group of one or more servers. According to various embodiments, all or a portion of operations performed in the electronic device 101 may be executed by another or plural electronic devices (e.g., the electronic devices 102 and 104 or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 at other device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
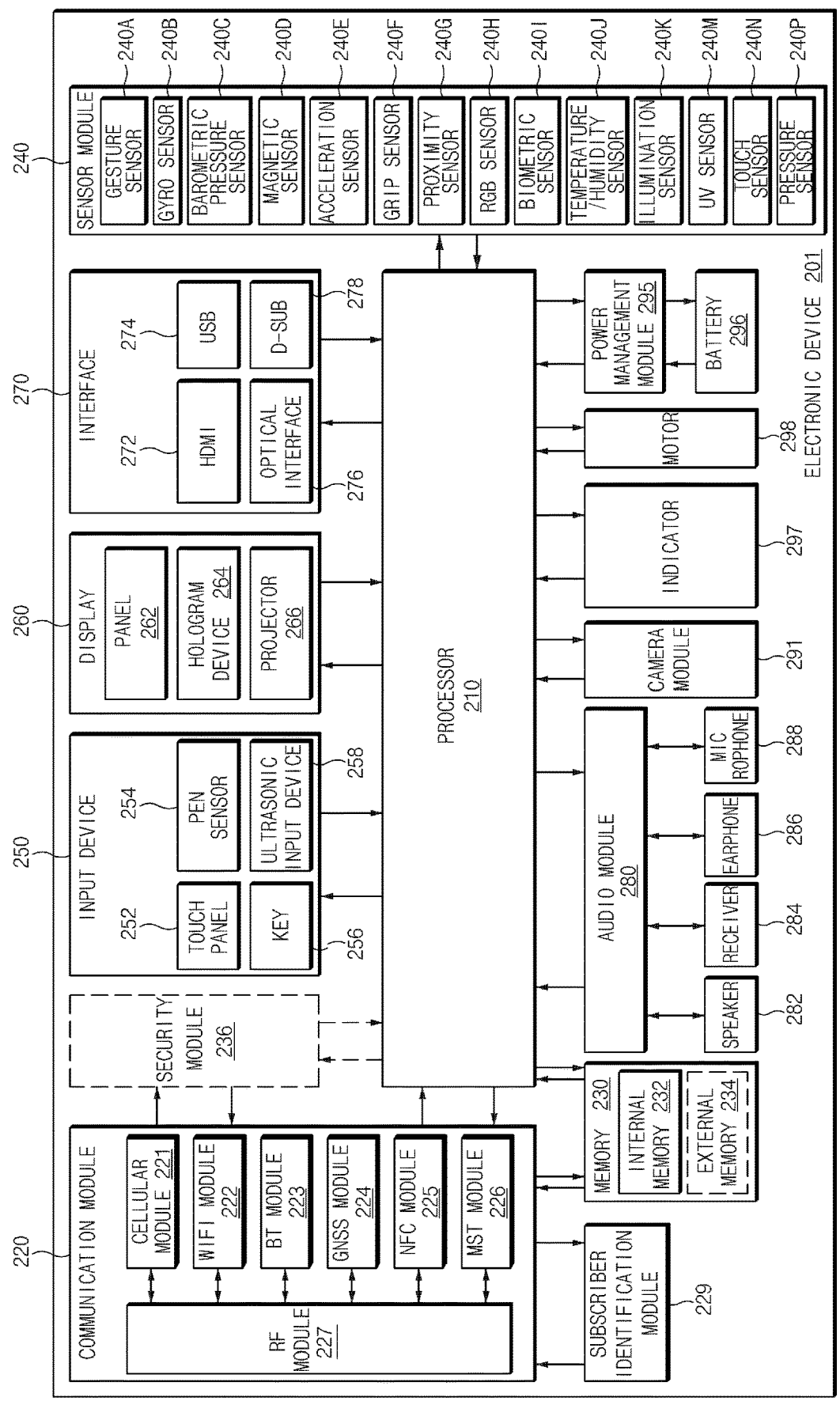
FIG. 2 illustrates a block diagram of the electronic device according to various embodiments.

FIG. 2 illustrates a block diagram of an electronic device, according to various embodiments.

Referring to FIG. 2, an electronic device 201 may include, for example, an entire part or a part of the electronic device 101 illustrated in FIG. 1. The electronic device 201 may include one or more processors (e.g., an application processor; AP) 210, a communication module 220, a subscriber identification module 229, a memory 230, a sensor module 240, an input device 250, a display 260, an interface 270, an audio module 280, a camera module 291, a power management module 295, a battery 296, an indicator 297, and a motor 298.

The at least one processor 210 may operate, for example, an operating system (OS) or an application to control a plurality of hardware or software elements connected to the processor 210 and may process and compute a variety of data. For example, the processor 210 may be implemented with a System on Chip (SoC). According to an embodiment, the at least one processor 210 may further include a graphic processing unit (GPU) and/or an image signal processor. The processor 210 may include at least a part (e.g., a cellular module 221) of elements illustrated in FIG. 2. The at least one processor 210 may load an instruction or data, which is received from at least one of other elements (e.g., a nonvolatile memory), into a volatile memory and process the loaded instruction or data. The at least one processor 210 may store a variety of data in the nonvolatile memory.

In certain embodiments, the at least one processor 210 can run an application program that causes the display 260 to display a user interface with content therein. The content can include, for example a map or image data. The at least one processor 210 can receive from a touch sensor 240N and a pressure sensor 240P data indicating a position and pressure of a touch. The processor can determine a selection area of the content from the application program 147 that includes the position of the touch based at least in part on the pressure, and cause the display to overlay an indication of the selection area onto the content.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, a MST module 226, and a radio frequency (RF) module 227.

The cellular module 221 may provide, for example, voice communication, video communication, a character service, an Internet service, or the like over a communication network. According to an embodiment, the cellular module 221 may perform discrimination and authentication of the electronic device 201 within a communication network by using the subscriber identification module (e.g., a SIM card) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

For example, the RF module 227 may transmit and receive a communication signal (e.g., an RF signal). For example, the RF module 227 may include a transceiver, a power amplifier module (PAM), a frequency filter, a low noise amplifier (LNA), an antenna, or the like. According to another embodiment, at least one of the cellular module 221, the Wi-Fi module 222, the BT module 223, the GNSS module 224, the NFC module 225, or the MST module 226 may transmit and receive an RF signal through a separate RF module.

The subscriber identification module 229 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 230 (e.g., the memory 130) may include an internal memory 232 or an external memory 234. For example, the internal memory 232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. For example, the security module 236 may be in a smart chip or a secure digital (SD) card, which is removable, or may include an embedded secure element (eSE) embedded in a fixed chip of the electronic device 201. Furthermore, the security module 236 may operate based on an operating system (OS) that is different from the OS of the electronic device 201. For example, the security module 236 may operate based on java card open platform (JCOP) OS.

The sensor module 240 may measure, for example, a physical quantity or may detect an operation state of the electronic device 201. The sensor module 240 may convert the measured or detected information to an electric signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, an UV sensor 240M, the touch sensor 240N, or a pressure sensor 240P. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch sensor or may include an additional sheet for recognition. The key 256 may include, for example, a physical button, an optical key, or a keypad. The ultrasonic input device 258 may detect (or sense) an ultrasonic signal, which is generated from an input device, through a microphone (e.g., a microphone 288) and may check data corresponding to the detected ultrasonic signal.

The display 260 (e.g., the display 160) may include a panel 262, a hologram device 264, or a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. For example, the screen may be arranged in the inside or the outside of the electronic device 201. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multimedia card (MMC) interface, or an infrared data association (IrDA) standard interface.

The audio module 280 may convert a sound and an electric signal in dual directions. At least a part of the audio module 280 may be included, for example, in the input/output interface 150 illustrated in FIG. 1. The audio module 280 may process, for example, sound information that is input or output through a speaker 282, a receiver 284, an earphone 286, or the microphone 288.

For example, the camera module 291 may shoot a still image or a video. According to an embodiment, the camera module 291 may include at least one or more image sensors (e.g., a front sensor or a rear sensor), a lens, an image signal processor (ISP), or a flash (e.g., an LED or a xenon lamp).

The power management module 295 may manage, for example, power of the electronic device 201. According to an embodiment, a power management integrated circuit (PMIC), a charger IC, or a battery or fuel gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specified state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments described in this disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3:
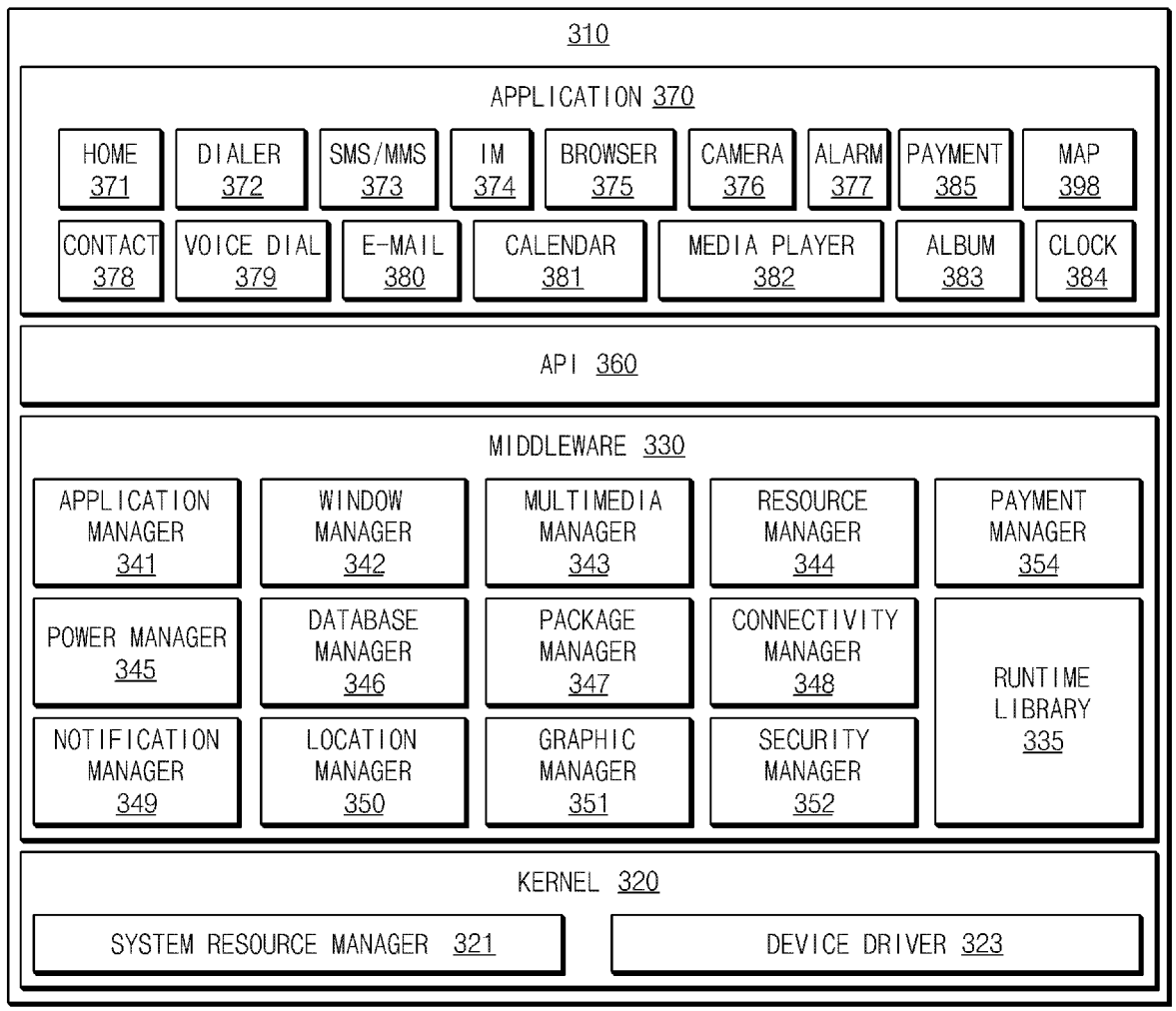
FIG. 3 illustrates a block diagram of a program module according to various embodiments.

FIG. 3 illustrates a block diagram of a program module, according to various embodiments.

According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, or Bada™.

The program module 310 may include a kernel 320, a middleware 330, an application programming interface (API) 360, and/or an application 370. At least a portion of the program module 310 may be preloaded on an electronic device or may be downloadable from an external electronic device (e.g., the electronic device 102 or 104, the server 106, or the like).

The kernel 320 (e.g., the kernel 141) may include, for example, a system resource manager 321 or a device driver 323. The system resource manager 321 may control, allocate, or retrieve system resources. According to an embodiment, the system resource manager 321 may include a process managing unit, a memory managing unit, a file system managing unit, or the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, or a payment manager 354.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a graphic user interface (GUI) resource that is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security, user authentication, or the like. According to an embodiment, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described elements. The middleware 330 may provide a module specialized to each OS kind to provide differentiated functions. Additionally, the middleware 330 may dynamically remove a part of the preexisting elements or may add new elements thereto.

The API 360 (e.g., the API 145) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, a timepiece 384, a payment 385, health care (e.g., measuring an exercise quantity, blood sugar, or the like) or offering of environment information (e.g., information of barometric pressure, humidity, temperature, or the like), and a map application 398.

According to an embodiment, the application 370 may include an application (hereinafter referred to as "information exchanging application" for descriptive convenience) to support information exchange between an electronic device (e.g., the electronic device 101) and an external electronic device (e.g., the electronic device 102 or 104). The information exchanging application may include, for example, a notification relay application for transmitting specified information to the external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the notification relay application may receive, for example, notification information from the external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., the electronic device 102 or 104) which communicates with the electronic device, an application running in the external electronic device, or a service (e.g., a call service, a message service, or the like) provided from the external electronic device.

According to an embodiment, the application 370 may include an application (e.g., a health care application of a mobile medical device) that is assigned in accordance with an attribute of an external electronic device (e.g., the electronic device 102 or 104). According to an embodiment, the application 370 may include an application that is received from the external electronic device (e.g., the server 106 or the electronic device 102 or 104). According to an embodiment, the application 370 may include a preloaded application or a third party application that is downloadable from a server. The names of elements of the program module 310 according to the embodiment may be modifiable depending on kinds of operating systems.

According to various embodiments, at least a portion of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, processes, or the like for performing one or more functions.

According to certain embodiments, one of the applications 370, such as, for example, the media player 382 or the map 398 can, when launched by one or more processors cause display of an interface with contents, such as an image or a map. Inputs, such as a touch, can be received on the display 260. The position and pressure of the touch can be communicated to the application 370 by the notification manager 349 through the API 360. The applications 370 can be configured to display an indicator of the selection area based on the position and pressure of the touch.

Figure 4:
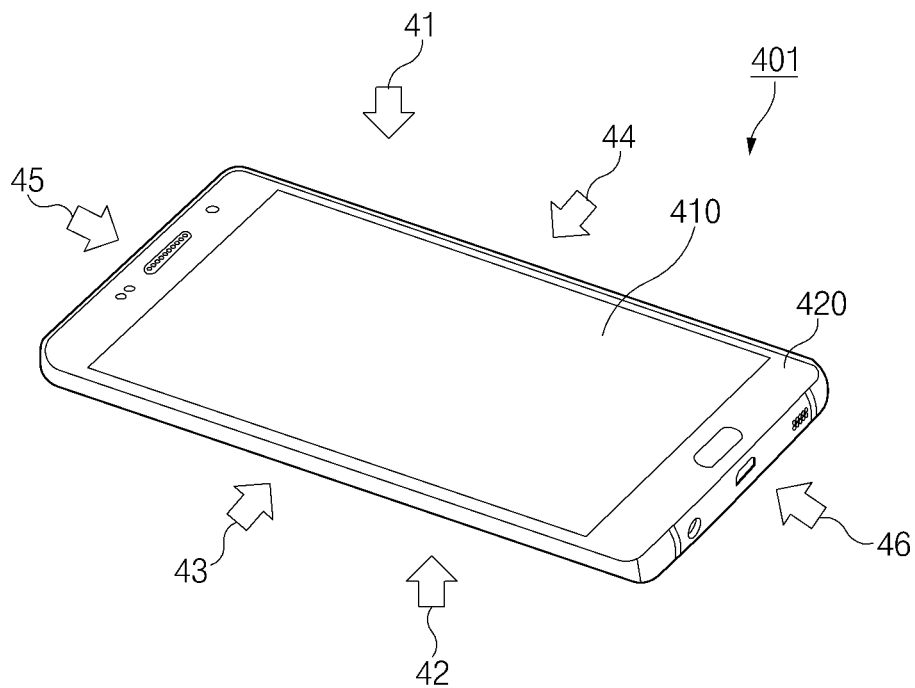
FIG. 4 illustrates an appearance of the electronic device according to an embodiment.

FIG. 4 illustrates an appearance of an electronic device according to an embodiment.

Referring to FIG. 4, an electronic device 401 according to an embodiment may include a display 410 and a housing 420 in appearance. Various circuits or modules such as a processor, a memory, and the like may be positioned inside the electronic device 401 (i.e., inside the housing 420).

According to embodiments, the display 410 may be positioned on a front surface (first surface) of the electronic device 401. For example, the display 410 may be interposed between the front surface (first surface) facing an upper direction (first direction) 41 and a rear surface (second surface) facing a lower direction (second direction) 42 and may be exposed in a manner to sense a touch and pressure of the touch from the outside through the front surface (first surface).

For example, the display 410 may output a plurality of items (e.g., a text, an image, a video, an icon, a widget, a symbol, or the like) or may receive a touch input (including a touch, a hovering, and a "force touch") from a user. To this end, the display 410 may include a cover glass, a display panel, a touch sensor, and/or a pressure sensor, for example. The cover glass, the display panel, the touch sensor, and/or the pressure sensor may have areas (e.g., the substantially the same area) corresponding to each other and may be positioned to be stacked (refer to FIG. 5). In certain embodiments, the cover glass is sufficiently thin or flexible, such that pressure against the cover glass from a touch is substantially transferred and sensed by the display 410.

According to various embodiments, the display 410 may be positioned on the front surface of the electronic device 401 and may further extend to at least one side surface from the front surface. For example, the display 410 may extend in a left-side direction 43 and/or a right-side direction 44. Since the display 410 extends in the left-side direction 43 and/or the right-side direction 44, the display 410 may be exposed to the outside through the left-side surface and the right-side surface as well as the front surface.

According to embodiments, the housing 420 may constitute at least part of the appearance of the electronic device 401. For example, the housing 420 may include the front surface (first surface) facing the first direction 41 and the rear surface (second surface) facing the second direction 42 that is opposite to the first direction 41. A side surface of the housing 420, which surrounds the first surface and the second surface, may include a left-side surface facing the left-side direction 43, a right-side surface facing the right-side direction 44, an upper-side surface facing an upper-side direction 45, and a bottom-side surface facing a bottom-side direction 46.

To protect various elements inside the electronic device 401 from external impact or dust, the housing 420 may be formed of a plastic injection-molding material, a conductive material (e.g., metal), or a combinations thereof. According to an embodiment, the housing 420 may be used as meaning indicating outer surfaces of a plurality of elements. For example, the front surface of the housing 420 may correspond to a cover glass included in the display 410, and the rear surface of the housing 420 may correspond to a back cover of the electronic device 401.

Figure 5:
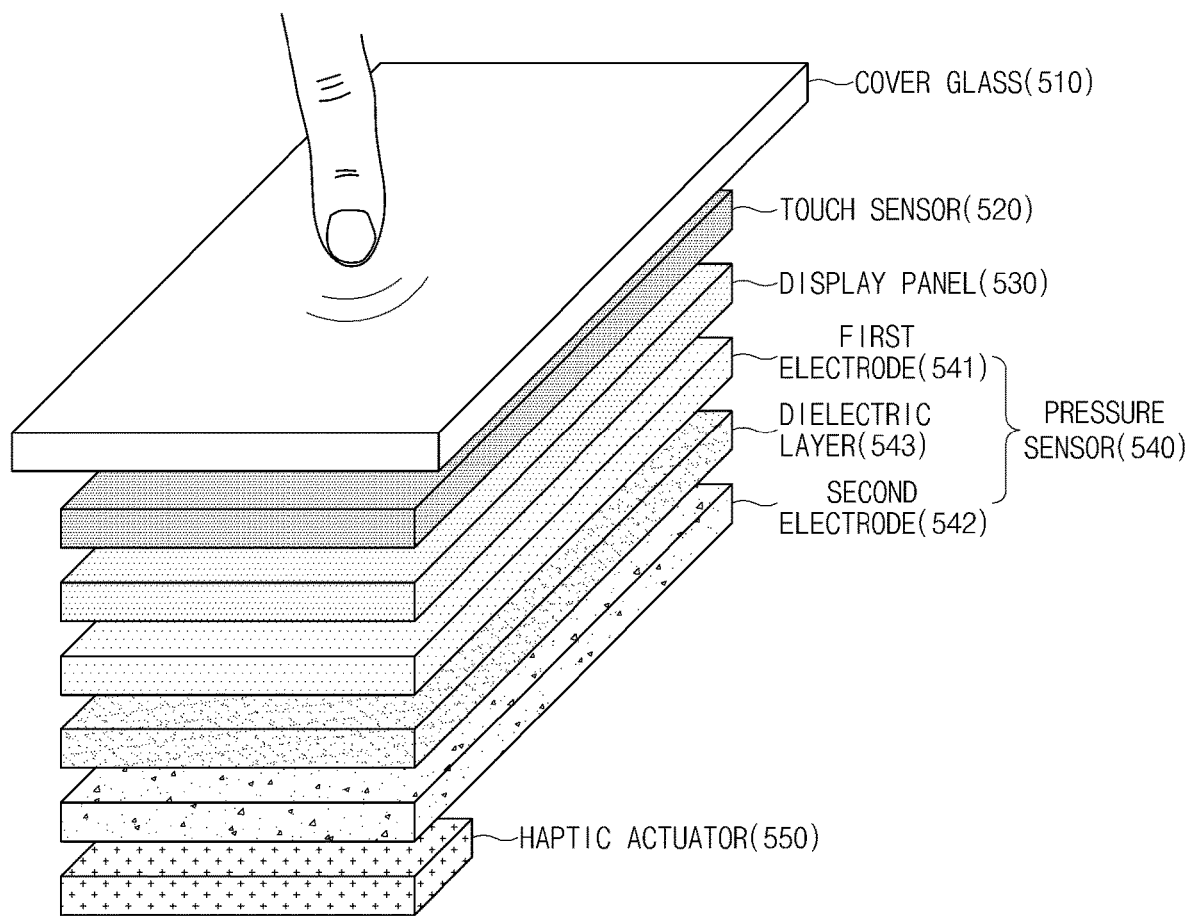
FIG. 5 illustrates a stacked structure of a display according to an embodiment.

FIG. 5 illustrates a stacked structure of a display according to an embodiment.

A stacked structure of a display according to an embodiment is illustrated in FIG. 5. For example, the stacked structure may be applied to the display 410 illustrated in FIG. 4. Accordingly, elements illustrated in FIG. 5 may be interposed between the front surface (first surface) and the rear surface (second surface) of the electronic device 401 of FIG. 4.

In the stacked structure of the display according to an embodiment, a cover glass 510 may pass light generated by a display panel 530. The user may touch a portion (e.g., a finger) of his/her body on the cover glass 510 to perform a "touch" (including a contact using an electronic pen) of the display panel 530. The cover glass 510 may be form of, for example, tempered glass, reinforced plastic, a flexible polymer material, or the like and may protect the display or an electronic device equipped with the display from an external shock. According to various embodiments, the cover glass 510 may be also referred to as a "glass window" or "cover window".

In a touch sensor 520, a specified physical quantity (e.g., a voltage, the amount of light, resistance, the amount of charges, or capacitance) may vary due to a contact of an external object (e.g., a finger of the user or an electronic pen). The touch sensor 520 may detect at least one position of a touch on the display (e.g., one a surface of the cover glass 510) by an external object based on a change in the specified physical quantity. For example, the touch sensor 520 may include a capacitive touch sensor, a touch sensitive sensor (e.g., a resistive touch sensor), an infrared touch panel, a piezo touch panel, or the like. According to various embodiments, the touch sensor 520 may be referred to as various names, such as a touch panel and the like, based on an implementation shape.

Although the finger does not actually make contact with the display panel 530, the touched point of the display panel 530 is the point in a plane defined by the display panel 530 that is directly below the point of the cover glass 510.

The display panel 530 may output at least one content or item (e.g., a text, an image, a video, an icon, a widget, a symbol, or the like). For example, the display panel 530 may include a liquid crystal display (LCD) panel, a light-emitting diode (LED) display panel, an organic LED (OLED) display panel, a microelectromechanical systems (MEMS) display panel, or an electronic paper display panel.

According to various embodiments of this disclosure, the display panel 530 may be integrally implemented with the touch sensor 520. In this case, the display panel 530 may be also referred to as a "touch screen panel (TSP)" or "touch screen display panel".

A pressure sensor 540 may detect pressure (or force) by an external object (e.g., a finger of the user or an electronic pen) against the display (e.g., a surface of the cover glass 510). According to an embodiment, the pressure sensor 540 may include a first electrode 541, a second electrode 542, and/or a dielectric layer 543. For example, the pressure sensor 540 may sense the pressure of the touch based on capacitance between the first electrode 541 and the second electrode 542, which varies due to the touch. A configuration of the pressure sensor 540 will be more fully described with reference to FIG. 6.

When a touch (including a hovering and a "force touch") is input by an external object (e.g., a finger of the user or an electronic pen), a haptic actuator 550 may provide the user with a haptic feedback (e.g., vibration). To this end, the haptic actuator 550 may include a piezoelectric member and/or a vibration plate.

The stacked structure of the display above described with reference to FIG. 5 is an example and is able to be variously changed or modified. For example, the touch sensor 520 may be formed directly on a back surface of the cover glass 510 (a so-called cover glass integrated touch panel), may be inserted between the cover glass 510 and the display panel 530 after being separately manufactured (a so-called add-on touch panel), may be formed directly on the display panel 530 (a so-called on-cell touch panel), or may be included inside the display panel 530 (a so-called in-cell touch panel). Also, according to various embodiments, an area-type fingerprint sensor that is implemented to be transparent or opaque may be additionally included in the above-described stacked structure. In certain embodiments, the stack can include a screen protector over the cover glass.

Figure 6:
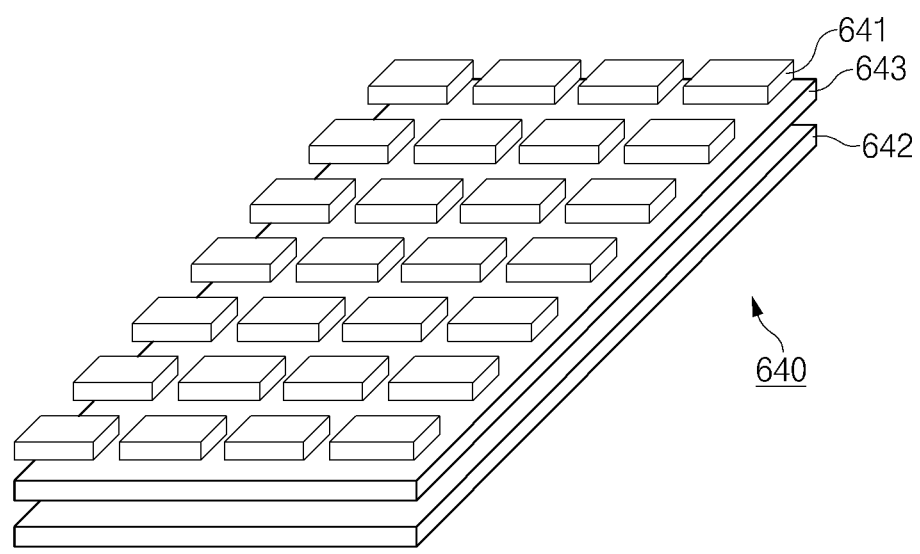
FIG. 6 illustrates a pressure sensor according to the embodiment.

FIG. 6 illustrates a pressure sensor according to the embodiment.

Referring to FIG. 6, a pressure sensor 640 according to an embodiment may include a first electrode 641, a second electrode 642, and a dielectric layer 643. For example, the pressure sensor 640 may correspond to the pressure sensor 540 illustrated in FIG. 5. However, a configuration of the pressure sensor 640 is not limited to an example illustrated in FIG. 6.

According to an embodiment, the first electrode 641 and/or the second electrode 642 may be implemented to be transparent or opaque. For example, if the first electrode 641 and/or the second electrode 642 is implemented to be opaque, a conductive member (e.g., a conductive patch, a conductive wire, or the like) of the first electrode 641 and/or the second electrode 642 may be formed of copper (Cu), silver (Ag), magnesium (Mg), titanium (Ti), opaque graphene, or the like. Also, if the first electrode 641 and/or the second electrode 642 is implemented to be transparent, the first electrode 641 and/or the second electrode 642 may be formed of indium thin oxide (ITO), indium zinc oxide (IZO), Ag nanowire, metal mesh, transparent conducting polymer, or transparent graphene.

According to an embodiment, one of the first electrode 641 and/or the second electrode 642 may be implemented with a metal plate that functions as ground (GND), and the other thereof may be formed to have a repeated polygon pattern by using the above-described material (a so-called self-capacitance manner). The first electrodes 641 are illustrated in FIG. 6 as being implemented with square conductive patches arranged in the form of an array. However, embodiments of this disclosure may not be limited thereto. Certain embodiments may include hexagons.

For another example, one (e.g., a transmitting terminal Tx) of the first electrode 641 and the second electrode 642 may be formed with a pattern extending in the first direction, and the other (e.g., a receiving terminal Rx) thereof may be formed with a pattern extending in the second direction intersecting the first direction at a specified angle (e.g., a right angle) (a so-called mutual-capacitance manner). According to various embodiments, the first electrode 641 and/or the second electrode 642 may be implemented with a conductive wire bent in the form of a strain gage pattern. For example, the first electrode 641 may be formed directly on a back surface of the display panel 530 (refer to FIG. 5). Alternatively, the first electrode 641 may be printed on a flexible printed circuit board (FPCB), and the FPCB may be attached to one surface of a display panel.

The dielectric layer 643 may be formed of a dielectric material having specified capacitance, for example, silicon foam, silicon membrane, optical clean adhesive (OCA), sponge, rubber, or polymer (e.g., polycabonate (PC), polyethylene terephthalate (PET), or the like).

Figure 7:
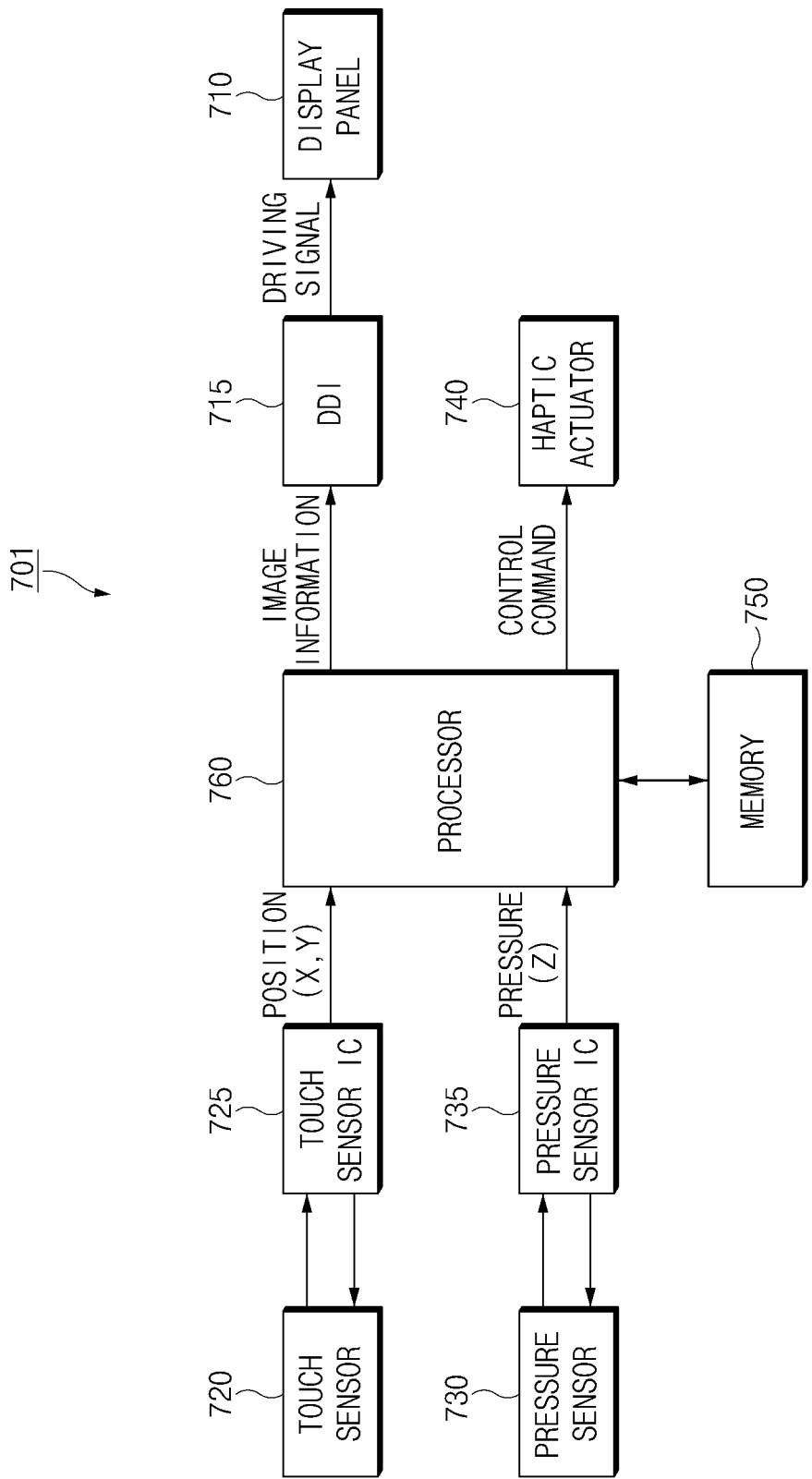
FIG. 7 illustrates a block diagram of the electronic device according to an embodiment.

FIG. 7 illustrates a block diagram of an electronic device according to an embodiment.

Referring to FIG. 7, an electronic device 701 according to an embodiment may include a display panel 710, a display driving integrated circuit (IC) (DDI) 715, a touch sensor 720, a touch sensor IC 725, a pressure sensor 730, a pressure sensor IC 735, a haptic actuator 740, a memory 750, and at least one processor 760. The display panel 710 may receive an image driving signal from the display driving integrated circuit (DDI) 715. The display panel 710 may display a variety of content (e.g., a text, an image, a video, an icon, a symbol, or the like) in response to the image driving signal. In this disclosure, the display panel 710 may be combined with the touch sensor 720 and/or the pressure sensor 730 (e.g., refer to FIG. 5) so as to be overlapped (refer to FIG. 5); in the case where the display panel 710 is called an "output means", the display panel may be simply referred to as a "display".

The display driving integrated circuit (DDI) 715 may supply the display panel 710 with an image driving signal corresponding to image information received from the at least one processor 760 (a host) at a frame rate that is determined in advance. The display driving integrated circuit 715 may include a graphics RAM, frame buffer, an interface module, an image processing unit, a multiplexer, a display timing controller (T-con), a source driver, a gate driver, and/or an oscillator.

In the touch sensor 720, a specified physical quantity (e.g., a voltage, the intensity of light, resistance, the amount of charges, capacitance, or the like) may vary due to a touch from the user. According to an embodiment, the touch sensor 720 may be positioned to be overlaid with the display panel 710.

The touch sensor IC 725 may sense a variation in a physical quantity in the touch sensor 720 and may calculate a position (X, Y), at which a touch is made, based on the variation in the physical quantity (e.g., a voltage, resistance, capacitance, or the like). The calculated position (or coordinates) may be provided (or reported) to the at least one processor 760.

According to various embodiments of this disclosure, if a portion (e.g., a finger) of a user body, a stylus (an example of an electronic pen), or the like makes contact with a cover glass (e.g., 510 of FIG. 5) of a display, a coupling voltage between a transmitting terminal Tx and a receiving terminal Rx included in the touch sensor 720 may vary. For example, the variation in the coupling voltage may be sensed by the touch sensor IC 725, and the touch sensor IC 725 may provide coordinates (X, Y) of a position, at which the touch is made, to the at least one processor 760. The at least one processor 760 may obtain data of the coordinates (X, Y) as a user input.

The touch sensor IC 725 may be referred to as a "touch IC", a "touch screen IC", a "touch controller", a "touch screen controller IC", or the like. According to various embodiments, in an electronic device in which the touch sensor IC 725 is not included, the at least one processor 760 may perform a role of the touch sensor IC 725. According to various embodiments, the touch panel IC 725 and the at least one processor 760 may be implemented with one element (e.g., one-chip).

The pressure sensor 730 may detect pressure (or force) by an external object (e.g., a finger or an electronic pen). According to an embodiment, in the pressure sensor 730, a physical quantity (e.g., capacitance) between the transmitting terminal Tx (e.g., the first electrode 641 of FIG. 6) and the receiving terminal Rx (e.g., the second electrode 642 of FIG. 6) may vary due to the touch.

The pressure sensor IC 735 may sense a variation in a physical quantity (e.g., capacitance or the like) in the pressure sensor 730 and may calculate pressure "Z" applied by a user touch based on the variation in the physical quantity. The pressure "Z" may be provided to the at least one processor 760 together with the position (X, Y) at which the touch is made.

According to various embodiments, the pressure sensor IC 735 may be referred to as a "force touch controller", a "force sensor IC", a "pressure panel IC", or the like. Also, according to various embodiments, the pressure sensor IC 735 may be implemented with one element (e.g., one-chip) together with the touch sensor IC 725.

The haptic actuator 740 may provide a user with a haptic feedback (e.g., vibration) in response to a control command of the at least one processor 760. For example, when a touch input (e.g., including a touch, a hovering, and a force touch) is received from the user, the haptic actuator 740 may provide the user with a haptic feedback.

The memory 750 may store commands or data associated with operations of elements included in the electronic device 701. According to various embodiments of this disclosure, the memory 750 may store at least one application program (e.g., an image viewer application, a multimedia play application, a map application, or the like) including a user interface for displaying at least one content in a display. For example, the memory 750 may store instructions that, which executed, cause the at least one processor 760 to perform various operations (e.g., refer to FIGS. 8A, 8B, 11A, 11B, 14A, 14B, and the like) disclosed in this specification.

For example, the at least one processor 760 may be electrically connected with the elements 710 to 750 included in the electronic device 701 and may execute operations or data processing associated with control and/or communication of the elements 710 to 750 included in the electronic device 701.

According to an embodiment of this disclosure, the at least one processor 760 may launch (or execute) an application that displays a user interface containing content on the display 710.

According to various embodiments of this disclosure, in the case where the launched application is a map application, content displayed on a user interface of the map application may include a map. For another example, in the case where the launched application is an image viewer application (e.g., a "Gallery" application), content displayed on a user interface of the image viewer application may include an image.

According to an embodiment, the at least one processor 760 may receive an indicator (data including the position coordinates (X, Y) of a touch) of a position of an external object, which pushes the display 710, from the touch sensor 720. In addition, the at least one processor 760 may receive an indicator (data including pressure "Z" of the touch) of the pressure of the external object, which presses against the display 710, from the pressure sensor 730.

The at least one processor 760 may determine at least one position on the content based at least in part on the indicator of the position received from the touch sensor 720. For example, on the basis of the indicator from the touch sensor 720, the at least one processor 760 may determine a position of a single touch (e.g., a first touch) or may respectively determine positions of a plurality of touches (e.g., a first touch and a second touch).

The at least one processor 760 may determine a selection area on the content based at least in part on the indicator of the pressure received from the pressure sensor 730. In this case, the selection area may include the at least one position (e.g., a position of the first touch and/or a position of the second touch).

Afterwards, the at least one processor 760 may present an indication of the at least one position (e.g., the position of the first touch and/or the position of the second touch) and an indication of the determined selection area on the display 710 over the content. For example, the indication of the at least one position (e.g., the position of the first touch and/or the position of the second touch) may include a first graphical indication representing the at least one position. Also, for example, the indication of the selection area may include a second graphical indication representing a boundary surrounding the selection area.

According to an embodiment of this disclosure, the at least one processor 760 may detect the first touch by an external object (e.g., a finger of the user or an electronic pen) by using the touch sensor 720 and may detect pressure of the first touch by using the pressure sensor 730.

If pressure of the first touch higher than a first pressure level determined in advance is detected (i.e., if a "force touch" is sensed), the at least one processor 760 may display a selection area including a position, at which the first touch is made, on the display 710.

The selection area may be specified in various manners. For example, the selection area may correspond to an area surrounded by a closed curve about the position at which the first touch is made. In this case, the closed curve may form any one of a substantially circular, elliptical or polygon figure.

In the case where an external object makes the first touch in a display with predetermined pressure, substantially the same pressure as the predetermined pressure may be detected at a touch point of the external object. However, pressure that is lower than the predetermined pressure may be detected on the periphery of the touch point (refer to FIG. 9). Accordingly, for example, the selection area may include an area at which pressure higher than a second pressure level is detected (the second pressure level<the first pressure level), wherein the second pressure is determined in advance.

The at least one processor 760 may expand or contract the selection area in response to pressure fluctuations of the first touch. The expansion or contraction of the selection area may be immediately applied to the display 710 in response to the pressure fluctuations of the first touch.

The at least one processor 760 may fix the selection area if a specified event is detected. For example, the specified event may include an event that the expansion or contraction of the selection area substantially stops; or fluctuation of the expansion or contraction is less than a predetermined amount during a specified time. As such, the selection area may be fixed at the time of the event. For another example, the specified event may include detection of the first touch's release. As the first touch's release causes rapid contraction or shrinkage of the selection area, the specified event may include an event that contraction rate of the selection area exceeds predetermined rate. For example, the predetermined rate may be based on a speed at which the first touch accompanying the selection area is detached from the display 710. As such, the selection area may be fixed at the time when contraction rate of the selection area exceeds the predetermined rate. The event for fixing the selection area may not be limited to the above-described events and may include pushing a physical button and the like.

According to an embodiment, an area that is limited in advance may be excluded from the fixed selection area depending on settings of an application being launched (executed) in the electronic device 710.

According to an embodiment, the at least one processor 760 may additionally detect the second touch by another external object by using the touch sensor 720 and may detect pressure of the second touch by using the pressure sensor 730. That is, the at least one processor 760 may sense the first touch and the second touch at the same time or at different times by using the touch sensor 720 and the pressure sensor 730 and may detect pressure of each of the first touch and the second touch. The at least one processor 760 can also sense or detect three or more touches and pressure by using the touch sensor 720 and the pressure sensor 730.

If the detected pressure of the first touch or the second touch is higher than the first pressure level (i.e., if at least one of the first touch and the second touch is a "force touch"), the at least one processor 760 may display the selection area including the position, at which the first touch is made, and the position, at which the second touch is made, on the display 710.

The selection area may be specified in various manners. According to an embodiment, the selection area may be surrounded by a closed curve. The closed curve surrounding the selection area may be inscribed at least one point with a boundary of an area at which pressure by the first touch and pressure by the second touch are detected as being higher than the second pressure level.

According to various embodiments of this disclosure, the closed curve may form any one of a circle, an ellipse, and a polygon. In the case where the closed curve is a circle, the position, at which the first touch is made, and the position, at which the second touch is made, may be on a diameter of the circle. Also, in the case where the closed curve is an ellipse, the position, at which the first touch is made, and the position, at which the second touch is made, may be on a long side of the ellipse.

According to an embodiment of this disclosure, if the selection area is fixed, the at least one processor 760 may enlarge the fixed selection area (content included in the fixed selection area) and may display the enlarged fixed selection area on the display 710. For example, the fixed selection area may be enlarged such that a boundary of the fixed selection area is inscribed at least one periphery of the display 710.

According to an embodiment of this disclosure, the at least one processor 760 may identify a functional object included in the fixed selection area, based on settings of an application being launched (executed) in the electronic device 701. For example, the at least one processor 760 may identify the functional object based on a specified algorithm. The at least one processor 760 may display a (graphical) indication of the identified functional object on the display 710.

For example, in the case where an image viewer application for viewing an image is being executed, the at least one processor 760 may identify an image object (e.g., a face object) included in the fixed selection area on the viewed image, based on an image object recognition algorithm (e.g., a face recognition algorithm or the like).

For another example, in the case where a map application (e.g., Google Maps™) for providing map content is being executed, on the basis of a search query (e.g., a gas station, a bank, ATM, a restaurant, a park, a café, or the like) input by the user, the at least one processor 760 may identify a functional object corresponding to the search query in the fixed selection area.

The above-described operations of the at least one processor 760 are, but are not limited to, an example. For example, operations of a processor described in other parts of this specification should be understood as operations of the at least one processor 760. Also, in this specification, at least some of operations described as operations of an "electronic device" should be understood as operations of the at least one processor 760. In addition, in some drawings of this specification, various embodiments of this disclosure will be described under execution of some applications. However, the embodiments are only exemplification, and various embodiments that are based on more various applications may be possible.

An electronic device according to an embodiment may include a housing that includes a first surface facing a first direction and a second surface facing a second direction opposite from the first direction, a display that is interposed between the first surface and the second surface and is exposed through the first surface, a touch sensor that is interposed between the first surface and the second surface and detects at least one position of a touch by an external object on the display, a pressure sensor that is interposed between the first surface and the second surface and detects pressure by the external object against the display, at least one processor that is electrically connected with the display, the touch sensor, and the pressure sensor, and a memory that is electrically connected with the processor. The memory may store a plurality of executable instructions that, when executed, cause the at least one processor to present the user interface containing the content on the display, to receive, from the touch sensor and the pressure sensor, indicators of the position and pressure of the external object pressing the display, to determine a primary position on the content, based at least in part on the position, to determine a selection area on the content that include the primary position, based at least in part on the pressure, and to display an indication of the selection area on the display.

According to another embodiment, the instructions may further include instructions that cause the at least one processor to determine a secondary position on the content, based at least in part on the data on the position and to determine the selection area of the content that includes the primary position and the secondary position, based at least in part on the data on the pressure.

According to another embodiment, the content may include a map.

According to another embodiment, the indication of the selection area may include a first graphical indication representing the primary position, and a second graphical indication representing a boundary of the selection area.

According to another embodiment, the content may include an image.

An electronic device according to an embodiment may include a display, a touch sensor, a pressure sensor, at least one processor that is electrically connected with the display, the touch sensor, and the pressure sensor, and a memory that is electrically connected with the at least one processor. The memory may store instructions that, when executed, cause the processor to detect a first touch by an external from the touch sensor, to detect pressure of the first touch from the pressure sensor, to output, on the display, a selection area including a position where the first touch is made, when the pressure of the first touch is detected as being higher than a first level, to expand or contract the selection area in response to pressure fluctuations of the first touch, and to fix the selection area when a specified event is detected.

According to another embodiment, the specified event may include an event that the expansion or contraction of the selection area stops during a specified time or more or an event that the selection area is contracted at a specified time change rate or more.

According to another embodiment, the selection area may correspond to an area surrounded by a closed curve having a center located substantially at the position where the first touch is made.

According to another embodiment, the selection area may include an area where pressure by the first touch is detected as being higher than a second pressure level. In this case, the second pressure level may be lower than the first pressure level.

According to another embodiment, the instructions may further include instructions that cause the processor to further detect a second touch by another external object from the touch sensor, to detect pressure of the second touch from the pressure sensor, and to output, on the display, the selection area including both the position where the first touch is made and a position where the second touch is made, when either the pressure the first touch or the pressure of the second touch is higher than a first pressure level.

According to another embodiment, a closed curve surrounding the selection area may be inscribed at least one point with a boundary of an area where pressure of the first touch and pressure of the second touch are detected as being higher than a second pressure level. In this case, the second pressure level may be lower than the first pressure level.

According to another embodiment, a closed curve surrounding the selection area may form at least one of a circle, an ellipse, and a polygon.

According to another embodiment, the instructions may further include instructions that cause the processor to exclude a restricted area from the selection area.

According to another embodiment, the instructions may further include instructions that cause the processor to enlarge the fixed selection area and output the enlarged selection area on the display.

According to another embodiment, the instructions may further include instructions that cause the processor to enlarge the fixed selection area such that a boundary of the fixed selection area borders at least one periphery of the display.

According to another embodiment, the instructions may further include instructions that cause the processor to identify a functional object included in the fixed selection area and to display an indication of the identified functional object on the display.

According to another embodiment, the instructions may further include instructions that cause the processor to specify the functional object based on a search query input from a user.

According to another embodiment, the instructions may further include instructions that cause the processor to specify the functional object based on a specified algorithm.

Figure 8A:
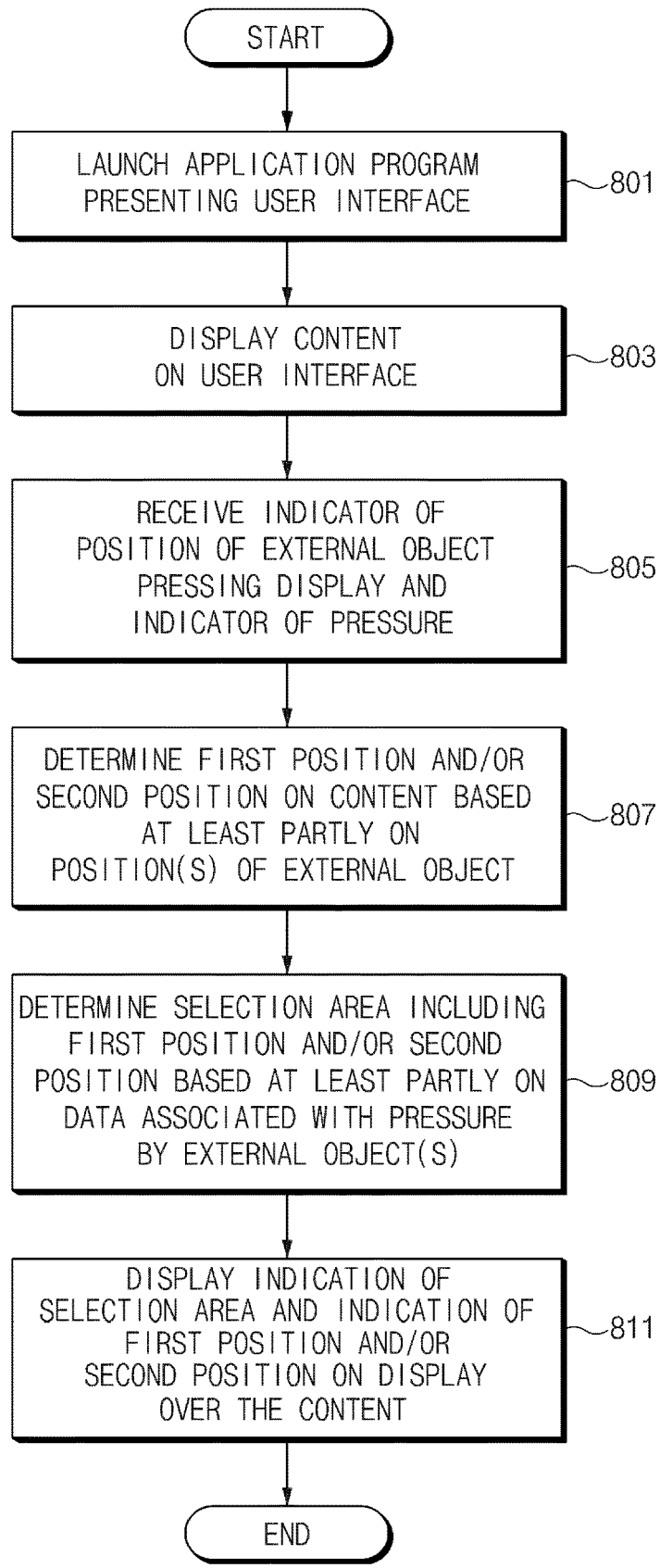
FIG. 8A and FIG. 8B illustrate a method for determining a selection area, according to an embodiment.

FIG. 8A illustrates a method for determining a selection area, according to an embodiment.

Referring to FIG. 8A, the selection area determining method according to an embodiment may include operation 801 to operation 811. Operation 801 to operation 811 may be executed by, for example, the electronic device 701 illustrated in FIG. 7. Operation 801 to operation 811 may be respectively implemented with, for example, instructions that are capable of being performed (or executed) by the processor 760 of the electronic device 701. The instructions may be stored in, for example, a computer-readable recording medium or the memory 750 of the electronic device 701 illustrated in FIG. 7. Below, operation 801 to operation 811 will be described by using the reference numerals of FIG. 7.

In operation 801, the processor 760 of the electronic device 701 may launch (or execute) an application that displays a user interface on the display 710. For example, the launched application may at least include a map application or an image viewer application.

In operation 803, the processor 760 may display content in a user interface presented on the display 710 in response to the launching of the application. For example, in the case where the launched application is the map application, the content displayed on the user interface may include a map. For another example, in the case where the launched application is the image viewer application, the content displayed on the user interface may include an image.

In operation 805, the processor 760 may receive an indicator associated with a position of an external object (e.g., a finger of the user or an electronic pen), which pushes the display 710, from the touch sensor 720 and may receive an indicator associated with pressure of the external object from the pressure sensor 730.

In operation 807, the processor 760 may determine at least one position (e.g., a first position and/or a second position) on the content output to the display 710, based at least in part on the position(s) of the external object in operation 805.

In operation 809, the processor 760 may determine a selection area on the content output to the display 710, based at least partially on the pressure data received in operation 805. In this case, the selection area may include the at least one position (e.g., a position of the first touch and/or a position of the second touch).

In operation 811, the processor 760 may present an indication of the at least one position (e.g., the position of the first touch and/or the position of the second touch) and an indication of the determined selection area on the display 710 over the content. For example, the indication of the at least one position (e.g., the position of the first touch and/or the position of the second touch) may include a first graphical indication representing the at least one position. Also, for example, the indication of the selection area may include a second graphical indication representing a boundary surrounding the selection area.

Figure 8B:
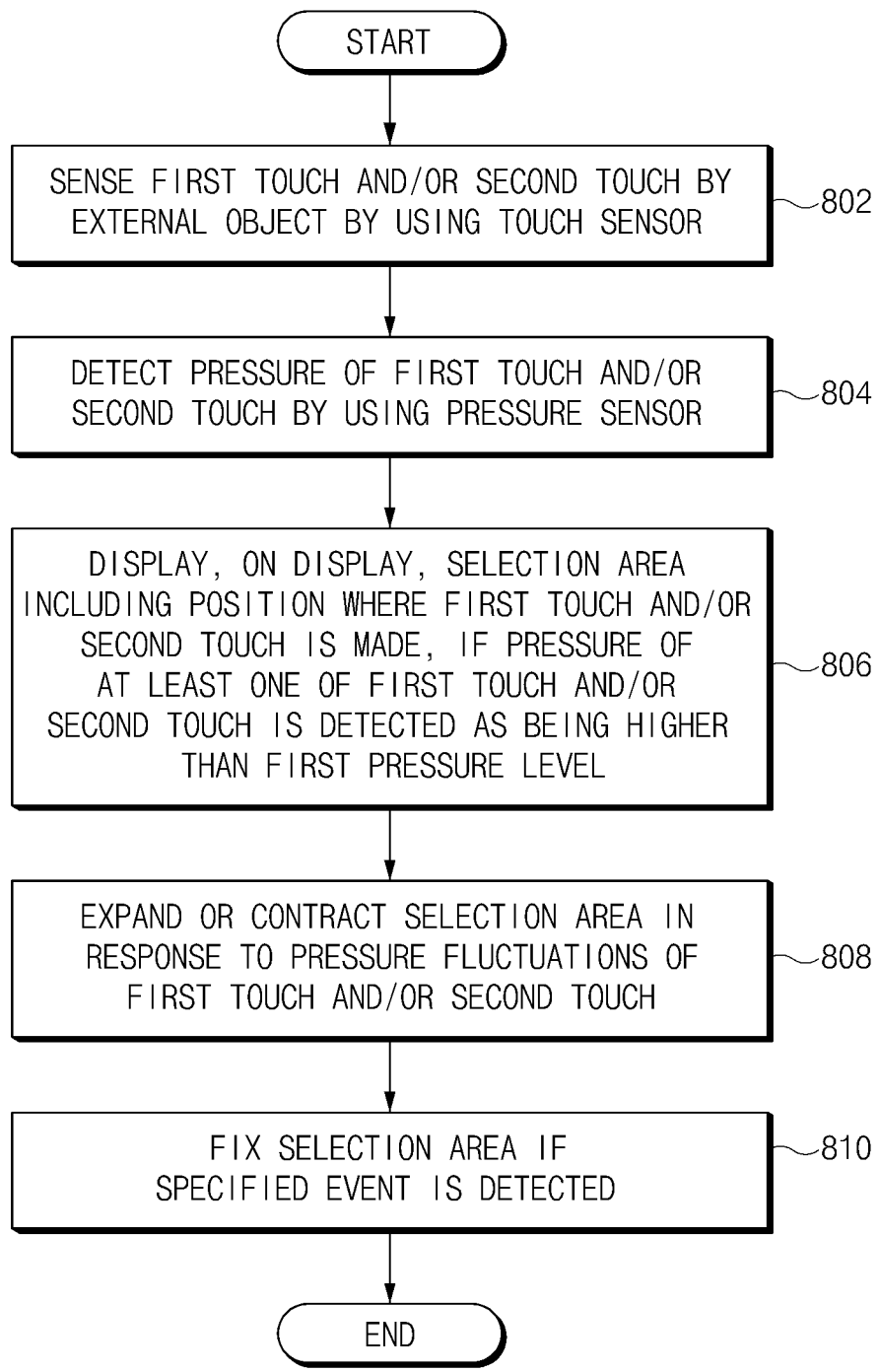

FIG. 8B illustrates a method for determining a selection area, according to another embodiment.

Referring to FIG. 8B, the selection area determining method according to an embodiment may include operation 802 to operation 810. Operation 802 to operation 810 may be executed by, for example, the electronic device 701 illustrated in FIG. 7. Operation 802 to operation 810 may be respectively implemented with, for example, instructions that are capable of being performed (or executed) by the processor 760 of the electronic device 701. The instructions may be stored in, for example, a computer-readable recording medium or the memory 750 of the electronic device 701 illustrated in FIG. 7. Below, operation 802 to operation 810 will be described by using the reference numerals of FIG. 7.

In operation 802, the processor 701 of the electronic device 701 may sense at least one touch (e.g., a first touch and/or a second touch) by an external object (e.g., a finger of the user or an electronic pen) by using the touch sensor 720.

In operation 804, the processor 760 may detect pressure of the at least one touch (e.g., the first touch and/or the second touch) by using the pressure sensor 730. According to various embodiments, operation 802 and operation 804 are illustrated as being independent of each other. However, the processor 760 may sense or detect a position and pressure of the at least one touch substantially at the same time in response to the at least one touch (e.g., the first touch and/or the second touch).

In operation 806, if the pressure of the at least one touch (e.g., the first touch and/or the second touch) is detected as being higher than the first pressure level determined in advance (i.e., if at least one of the first touch and the second touch is a "force touch"), the processor 760 may display a selection area including the position, at which the at least one touch (e.g., the first touch and/or the second touch) is made, on the display 710.

According to various embodiments of this disclosure, the selection area may be specified in various manners. For example, in the case where the at least one touch includes only the first touch, the selection area may correspond to an area surrounded by a closed curve, a center of which is located substantially (or within 2% of an X or Y dimension of closed curve) at the position at which the first touch is made. The closed curve may form any one of a circle, an ellipse, and a polygon. The selection area may correspond to an area at which pressure higher than the second pressure level is detected.

For another example, in the case where the at least one touch includes the first touch and the second touch, the closed curve surrounding the selection area may be inscribed at least one point with a boundary of an area at which pressure of the first touch and pressure of the second touch are detected as being higher than the second pressure level.

The closed curve may form any one of a circle, an ellipse, and a polygon. For example, in the case where the closed curve forms a circle, the position, at which the first touch is made, and the position, at which the second touch is made, may be on a diameter of the circle. In the case where the closed curve forms an ellipse, the position, at which the first touch is made, and the position, at which the second touch is made, may be on a long side of the ellipse.

In operation 808, the processor 760 may expand or contract the selection area in response to pressure fluctuations of the at least one touch (e.g., the first touch and/or the second touch). For example, if pressure of the at least one touch (e.g., the first touch and/or the second touch) increases, the processor 760 may expand the selection area. In contrast, if pressure of the at least one touch (e.g., the first touch and/or the second touch) decreases, the processor 760 may contract the selection area.

In operation 810, the processor 760 may fix the selection area if a specified event is detected. For example, the specified event may include an event that the expansion or contraction of the selection area stops during a specified time or more. For another example, the specified event may include an event that the selection area is reduced at a specified time change rate or more (rapidly).

According to various embodiments, in at least one among operation 806 to operation 810, an area that is limited in advance may be excluded from the selection area.

Figure 9:
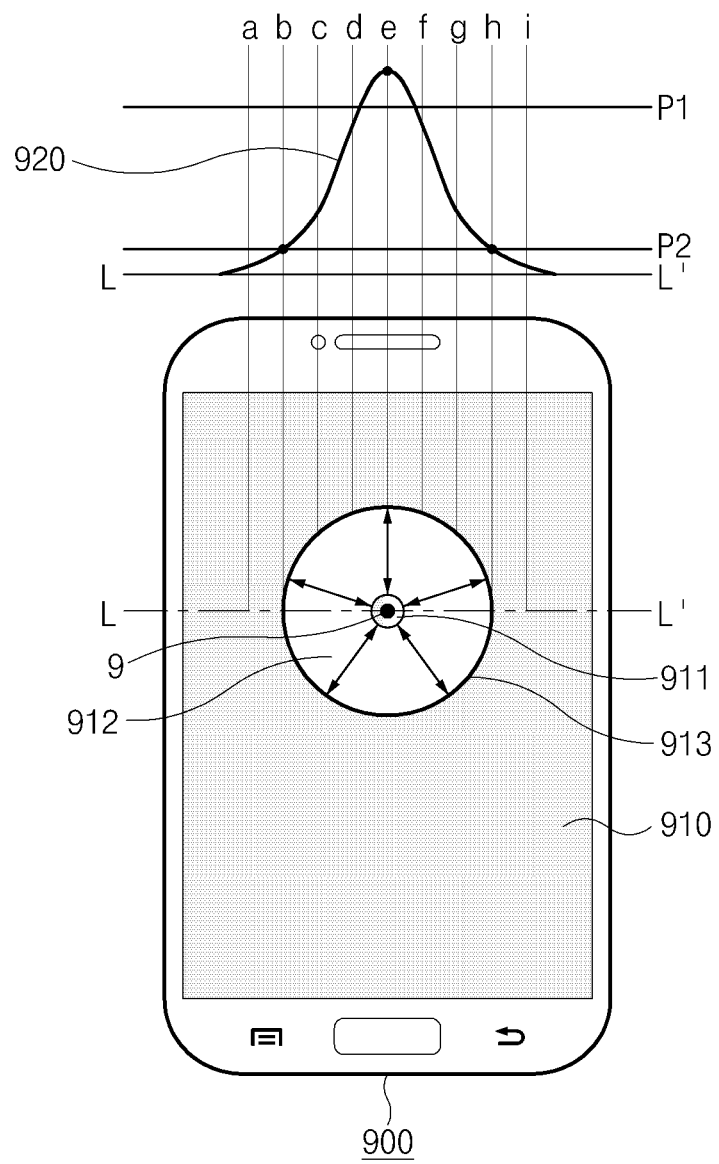
FIG. 9 is a diagram for describing a method for determining a selection area based on a single touch, according to an embodiment.

FIG. 9 is a diagram for describing a method for determining a selection area based on a single touch, according to an embodiment.

According to an embodiment, an electronic device 900 that performs a method for determining a selection area based on a single touch is illustrated in FIG. 9. For example, the electronic device 900 may correspond to the electronic device 701 of FIG. 7.

According to an embodiment, the electronic device 900 may execute various applications (e.g., an image viewer application, a multimedia play application, a map application, and the like). The electronic device 900 may display a user interface and/or content of an application in a display 910 by executing the application.

According to an embodiment, the user may perform a touch 9 having predetermined pressure on the display 910. The electronic device 900 may detect a position and pressure of the touch 9 in response to the touch 9 (for example using a touch sensor or a pressure sensor). For example, the position of the touch 9 may correspond to a touch point 911.

For example, there is assumed a line L-L' that passes through the center of the touch point 911 and extends in a horizontal direction of the electronic device 900. For example, pressure that the electronic device 900 detects along the line L-L' may have continuous values like a curve 920. According to various embodiments, the pressure of the touch 9 detected along the line L-L' by the electronic device 900 may have discrete values. In certain embodiments, the curve 920 may represent pressure as (vertical axis) as a function of distance from the touch point 911 (where e is 0).

Referring to the curve 920, pressure that is substantially the same as the pressure of the touch 9 may be detected at a position of an auxiliary line "e". The reason is that the touch point 911 of the touch 9 is formed at the position of the auxiliary line "e". Pressure that is detected at positions of neighboring auxiliary lines "a" to "d" and "f" to "i" with respect to the auxiliary line "e", may become lower as a distance from the position of the auxiliary line "e" increases.

According to an embodiment, since pressure higher than a first pressure level P1 is detected at the position (i.e., the touch point 911) of the auxiliary line "e", the touch 9 may be recognized as a "force touch". Since the electronic device 900 recognizes the "force touch", the electronic device 900 may display a selection area 912 including a position (i.e., the touch point 911), at which the touch 9 is made, on the display 910.

According to one aspect, the selection area 912 may correspond to an area that is surrounded by a circle 913, a center of which is located at the position where the touch 9 is made. According to another aspect, as illustrated in the curve 920, the selection area 912 may correspond to an area at which pressure by the touch 9 is detected as being higher than a second pressure level P2. Also, the selection area 912 may be expanded or contracted in response to pressure fluctuations of the touch 9.

For example, if the pressure at point 9 increases (value at "e" increases), it is possible that the pressure at "a" and "i" will increase to exceed P2 causing curve 920 to expand to include "a" and "i". If the pressure at point 9 decreases (value at "e" decreases), it is possible that the pressure at "b" and "h" will decrease to less than P2 causing curve 920 to contract to exclude "b" and "h".

If a specified event is detected, the electronic device 900 may fix the selection area 912 corresponding to a point in time when the specified event is detected. In the case where the user detaches his/her finger from the display 910 before the selection area 912 is fixed, the selection area 912 may disappear. Also, according to various embodiments, even though the selection area 912 is fixed, the selection area 912 may disappear if the user additionally touches an area except from the selection area 912 or pushes a back-key.

Figure 10A:
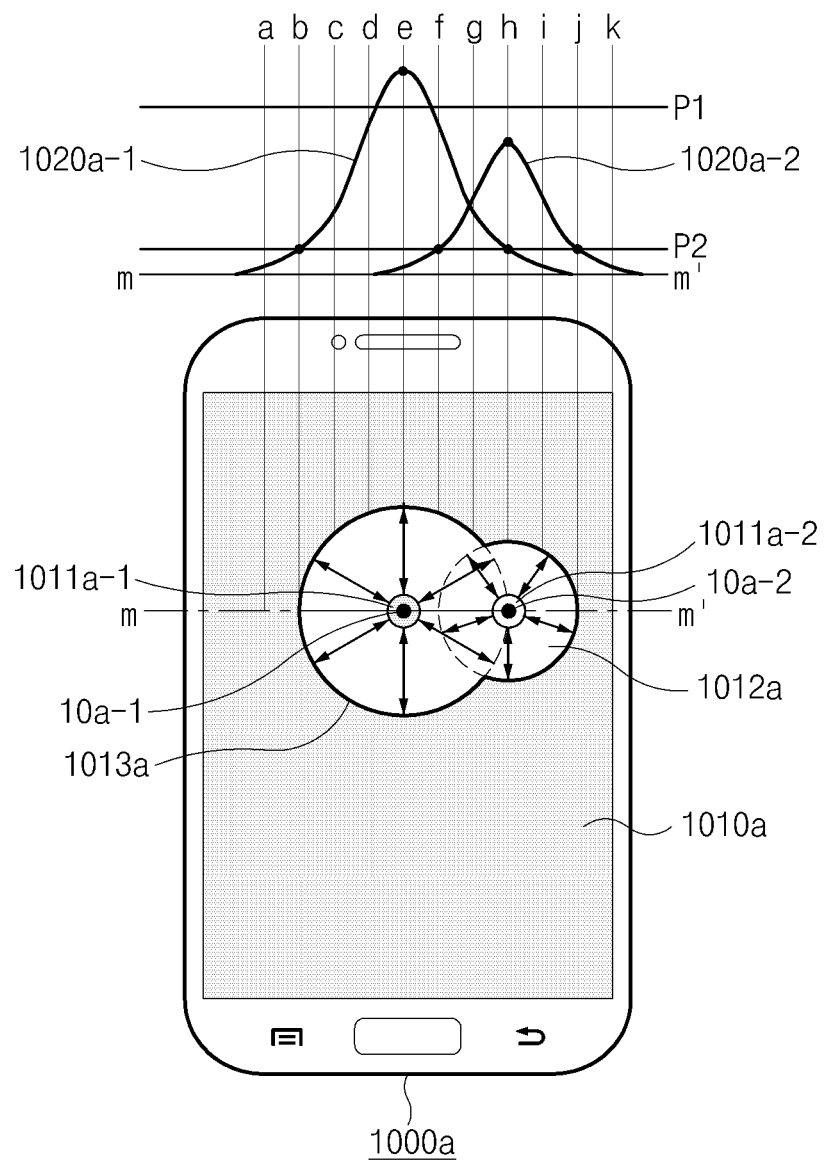
FIG. 10A, FIG. 10B and FIG. 10C are diagrams for describing a method for determining a selection area based on a multi-touch, according to various embodiments.
Figure 10B:
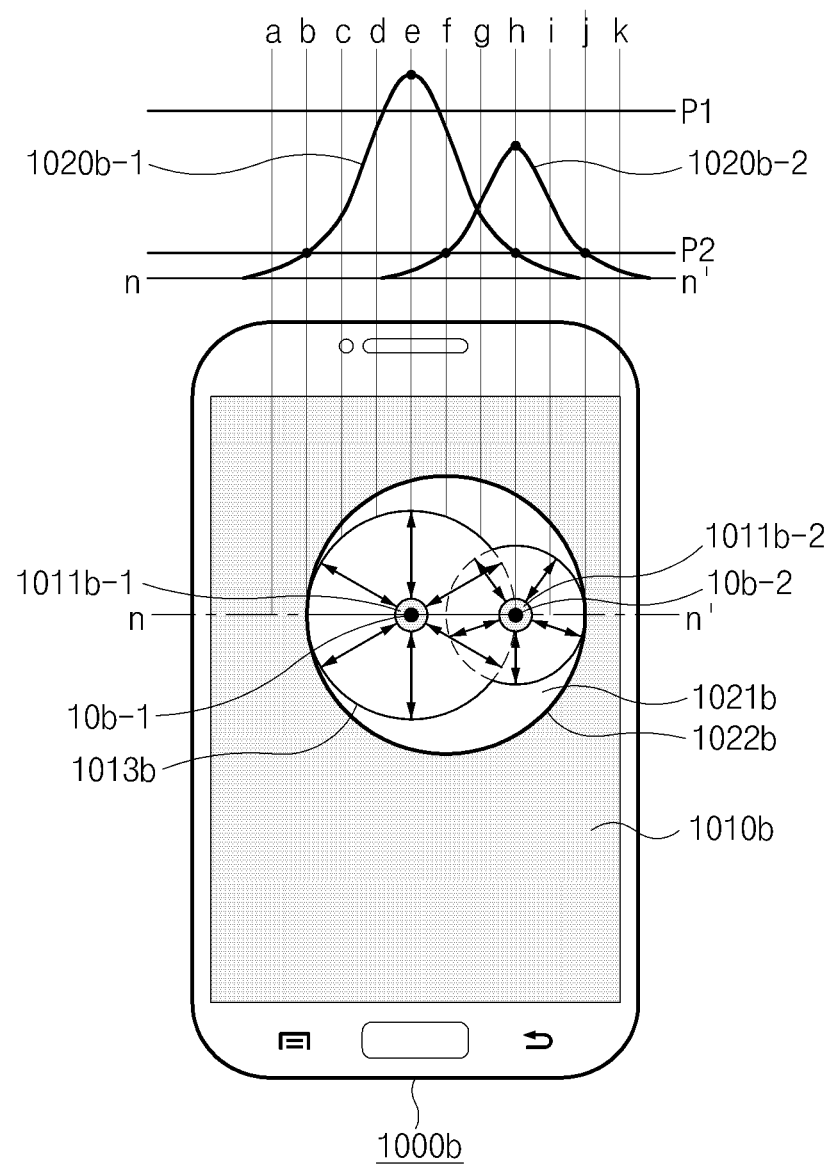
Figure 10C:
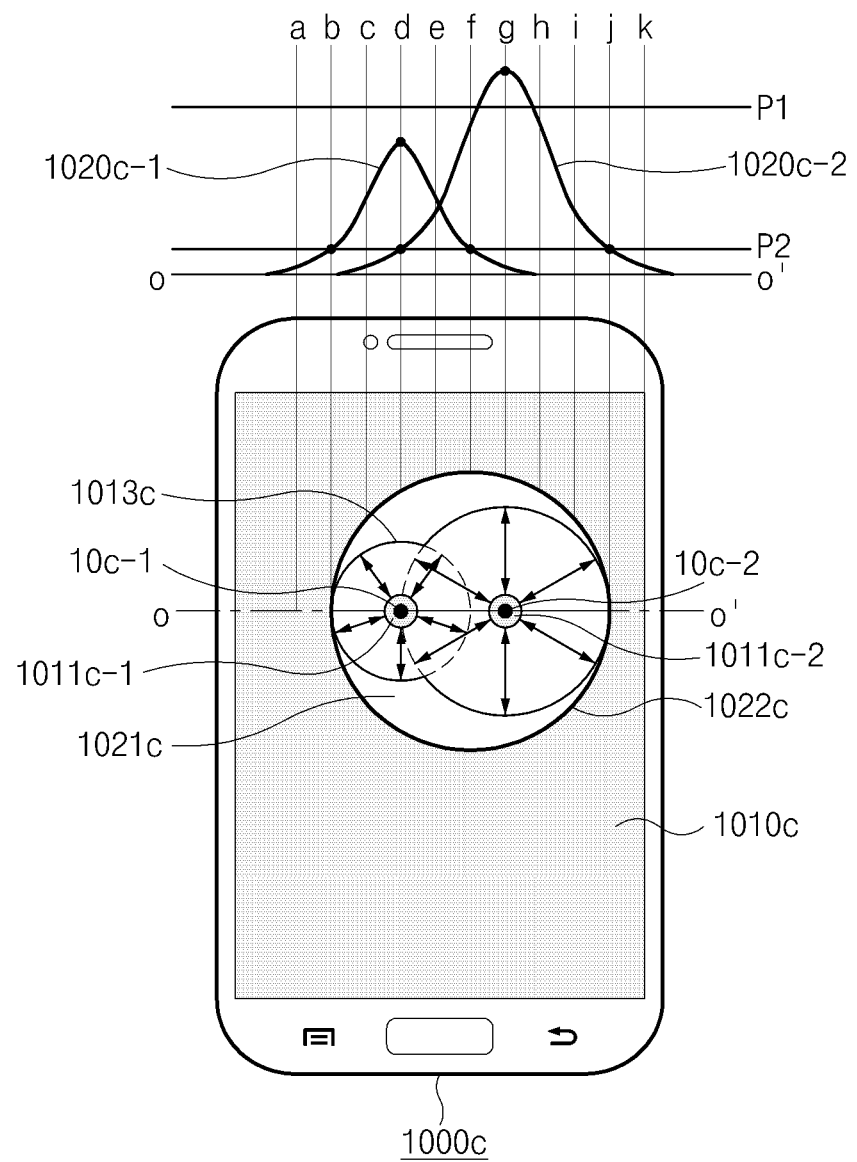

FIGS. 10A to 10C are diagrams for describing a method for determining a selection area based on a multi-touch, according to various embodiments.

According to an embodiment, an electronic device 1000a that performs a method for determining a selection area based on a multi-touch is illustrated in FIG. 10A. For example, the electronic device 1000a may correspond to the electronic device 701 of FIG. 7.

According to an embodiment, the electronic device 1000a may execute various applications. The electronic device 1000a may execute an application to display a user interface and/or content of the application on the display 1010a.

According to an embodiment, the user may perform a first touch 10a-1 and a second touch 10a-2 on the display 1010a simultaneously or respectively. The electronic device 1000a may detect positions and pressure (using, for example touch and pressure sensors) of the first touch 10a-1 and the second touch 10a-2 in response to the first touch 10a-1 and the second touch 10a-2, respectively. For example, the position of the first touch 10a-1 may correspond to a touch point 1011a-1, and the position of the second touch 10a-2 may correspond to a touch point 1011a-2.

For example, there is assumed a line m-m' passing through the centers of the touch point 1011a-1 and the touch point 1011a-2. For example, pressure that the electronic device 1000a detects along the line m-m' may have continuous values like a first curve 1020a-1 and a second curve 1020a-2. The first curve 1020a-1 may correspond to the separate pressure of the first touch 10a-1, and the second curve 1020a-2 may correspond to the separate pressure of the second touch 10a-2. According to various embodiments, the pressure of the touches 10a-1 and 10a-2 detected along the line m-m' by the electronic device 1000a may have discrete values.

In certain embodiments, the pressure sensed by the pressure sensor is the sum of curves 1020a-1 and 1020a-2. However, the pressure curves 1020a-1 due touch at 10a-1 and 1020a-2 due to touch at 10a-2 can be determined by comparing the total pressure curve with characteristic curves. Referring to the first curve 1020a-1, pressure that is substantially the same as the pressure of the first touch 10a-1 may be detected at a position of an auxiliary line "e". Also, referring to the second curve 1020a-2, pressure that is substantially the same as the pressure of the second touch 10a-2 may be detected at a position of an auxiliary line "h". The reason is that the touch point 1011a-1 of the touch 10a-1 is formed at the position of the auxiliary line "e" and the touch point 1011a-2 of the touch 10a-2 is formed at the position of the auxiliary line "h".

According to an embodiment, since pressure that is higher than the first pressure level P1 is detected at the position (i.e., the touch point 1011a-1) of the auxiliary line "e", the electronic device 1000a may recognize the first touch 10a-1 as a "force touch". Since the electronic device 1000a recognizes the first touch 10a-1 as a "force touch", the electronic device 1000a may display, on the display 1010a, a selection area 1012a including the position (i.e., the touch point 1011a-1) where the first touch 10a-1 is made and the position (i.e., the touch point 1011a-2) where the second touch 10a-2 is made.

As understood from the first curve 1020a-1 and the second curve 1020a-2, the selection area 1012a may correspond to an area where pressure by the first touch 10a-1 and pressure by the second touch 10a-2 are detected as being higher than the second pressure level P2. As such, a boundary or an outline 1013a of the selection area 1012a may correspond to a circumference of an area formed by uniting an area where the pressure by the first touch 10a-1 is detected as being higher than the second pressure level P2 and an area where the pressure by the second touch 10a-2 is detected as being higher than the second pressure level P2.

Additionally, in certain embodiments, the total pressure exceeds P2, but pressure from neither curve 1020c-1 nor 1020c-2, alone exceeds P2. In certain embodiments, this point can be excluded from the selection area. In other embodiments, the point can be included in the selection area.

Also, the selection area 1012a may be expanded or contracted in response to pressure fluctuations of the first touch 10a-1 and the second 10a-2; if a specified event is detected, the selection area 1012a may be fixed as a selection area of a point in time when the specified event is detected.

According to an embodiment, an electronic device 1000b that performs a method for determining a selection area based on a multi-touch is illustrated in FIG. 10B. For example, the electronic device 1000b may correspond to the electronic device 701 of FIG. 7.

According to an embodiment, the electronic device 1000b may execute various applications. The electronic device 1000b may execute an application to display a user interface and/or content of the application on the display 1010b.

According to an embodiment, the user may perform a first touch 10b-1 and a second touch 10b-2 on the display 1010b. The electronic device 1000b may detect positions and pressure of the first touch 10b-1 and the second touch 10b-2 in response to the first touch 10b-1 and the second touch 10b-2, respectively. For example, the position of the first touch 10b-1 may correspond to a touch point 1011b-1, and the position of the second touch 10b-2 may correspond to a touch point 1011b-2.

For example, there is assumed a line n-n' passing through the centers of the touch point 1011b-1 and the touch point 1011b-2. For example, pressure that the electronic device 1000b detects along the line n-n' may have continuous values like a first curve 1020b-1 and a second curve 1020b-2. The first curve 1020b-1 may correspond to the pressure of the first touch 10b-1 separately, and the second curve 1020b-2 may correspond to the pressure of the second touch 10b-2, separately. According to various embodiments, the pressure of the touches 10b-1 and 10b-2 detected along the line n-n' by the electronic device 1000b may have discrete values.

Referring to the first curve 1020b-1, pressure that is substantially the same as the pressure of the first touch 10b-1 may be detected at a position of an auxiliary line "e". Also, referring to the first curve 1020b-2, pressure that is substantially the same as the pressure of the second touch 10b-2 may be detected at a position of an auxiliary line "h". The reason is that the touch point 1011b-1 of the touch 10b-1 is formed at the position of the auxiliary line "e" and the touch point 1011b-2 of the touch 10b-2 is formed at the position of the auxiliary line "h".

According to an embodiment, since pressure that is higher than the first pressure level P1 is detected at the position (i.e., the touch point 1011b-1) of the auxiliary line "e", the electronic device 1000b may recognize the first touch 10b-1 as a "force touch". Since the electronic device 1000b recognizes the first touch 10b-1 as a "force touch", the electronic device 1000b may display, on the display 1010b, a selection area 1021b including the position (i.e., the touch point 1011b-1) where the first touch 10b-1 is made and the position (i.e., the touch point 1011b-2) where the second touch 10b-2 is made.

The selection area 1021b may correspond to an area 1013b where pressure by the first touch 10b-1 and pressure by the second touch 10b-2 are detected as being higher than the second pressure level P2. The area 1013b may correspond to an area formed by uniting an area where the pressure by the first touch 10b-1 is detected as being higher than the second pressure level P2 and an area where the pressure by the second touch 10b-2 is detected as being higher than the second pressure level P2 (refer to the first curve 1020b-1 and the second curve 1020b-1).

The selection area 1021b may be surrounded by a closed loop 1022b. The closed curve 1022b surrounding the selection area 1021b may be inscribed at least one point with a circumference of the area 1013b where pressure of the first touch 10b-1 and pressure of the second touch 10b-2 are detected as being higher than the second pressure level P2.

According to various embodiments, the selection area 1021b may be expanded or contracted in response to pressure fluctuations of the first touch 10b-1 and the second 10b-2; if a specified event is detected, the selection area 1021a may be fixed as a selection area of a point in time when the specified event is detected.

According to an embodiment, an electronic device 1000c that performs a method for determining a selection area based on a multi-touch is illustrated in FIG. 10C.

According to various embodiments, the user may perform a first touch 10c-1 and a second touch 10c-2 on a display 1010c. For example, the first touch 10c-1 and the second touch 10c-2 may correspond to touches deduced as a result of pressure fluctuations of the first touch 10b-1 and the second touch 10b-2 illustrated in FIG. 10B. If the pressure of the first touch 10b-1 illustrated in FIG. 10B decreases, the first touch 10b-1 may turn into the first touch 10c-1 of FIG. 10C; if the pressure of the second touch 10b-2 illustrated in FIG. 10B increases, the second touch 10b-2 may turn into the second touch 10c-2 of FIG. 10C.

The electronic device 1000c may detect positions and pressure of the first touch 10c-1 and the second touch 10c-2 in response to the first touch 10c-1 and the second touch 10c-2, respectively. For example, the position of the first touch 10c-1 may correspond to a touch point 1011c-1, and the position of the second touch 10c-2 may correspond to a touch point 1011c-2.

Also, for example, there is assumed a line o-o' passing through the centers of the touch point 10c-1 and the touch point 10c-2. For example, pressure that the electronic device 1000c detects along the line o-o' may have continuous values like a first curve 1020c-1 and a second curve 1020c-2. The first curve 1020c-1 may correspond to the pressure of the first touch 10c-1, and the second curve 1020c-2 may correspond to the pressure of the second touch 10c-2. According to various embodiments, the pressure of the touches 10c-1 and 10c-2 detected along the line o-o' by the electronic device 1000c may have discrete values.

Referring to the first curve 1020c-1, pressure that is substantially the same as the pressure of the first touch 10c-1 may be detected at a position of an auxiliary line "d". Referring to the second curve 1020c-2, pressure that is substantially the same as the pressure of the second touch 10c-2 may be detected at a position of an auxiliary line "g". The reason is that the touch point 1011c-1 of the touch 10c-1 is formed at the position of the auxiliary line "d" and the touch point 1011c-2 of the touch 10c-2 is formed at the position of the auxiliary line "g".

According to an embodiment, since pressure that is higher than the first pressure level P1 is detected at the position (i.e., the touch point 1011c-2) of the auxiliary line "g", the electronic device 1000c may recognize the second touch 10c-2 as a "force touch". Since the electronic device 1000c recognizes the second touch 10c-2 as a "force touch", the electronic device 1000c may display, on the display 1010c, a selection area 1021c including the position (i.e., the touch point 1011c-1) where the first touch 10c-1 is made and the position (i.e., the touch point 1011c-2) where the second touch 10c-2 is made.

The selection area 1021c may include an area 1013c where pressure by the first touch 10c-1 and pressure by the second touch 10c-2 are detected as being higher than the second pressure level P2. The area 1013c may correspond to an area formed by uniting an area where the pressure by the first touch 10c-1 is detected as being higher than the second pressure level P2 and an area where the pressure by the second touch 10c-2 is detected as being higher than the second pressure level P2 (refer to the first curve 1020c-1 and the second curve 1020c-1).

According to various embodiments of this disclosure, the selection area 1021c may be surrounded by a closed loop 1022c. The closed curve 1022c surrounding the selection area 1021c may be inscribed at least one point with a circumference of the area 1013c where pressure of the first touch 10c-1 and pressure of the second touch 10c-2 are detected as being higher than the second pressure level P2.

The selection area 1021c may be expanded or contracted in response to pressure fluctuations of the first touch 10c-1 and the second 10c-2; if a specified event is detected, the selection area 1021c may be fixed as a selection area of a point in time when the specified event is detected.

Figure 11A:
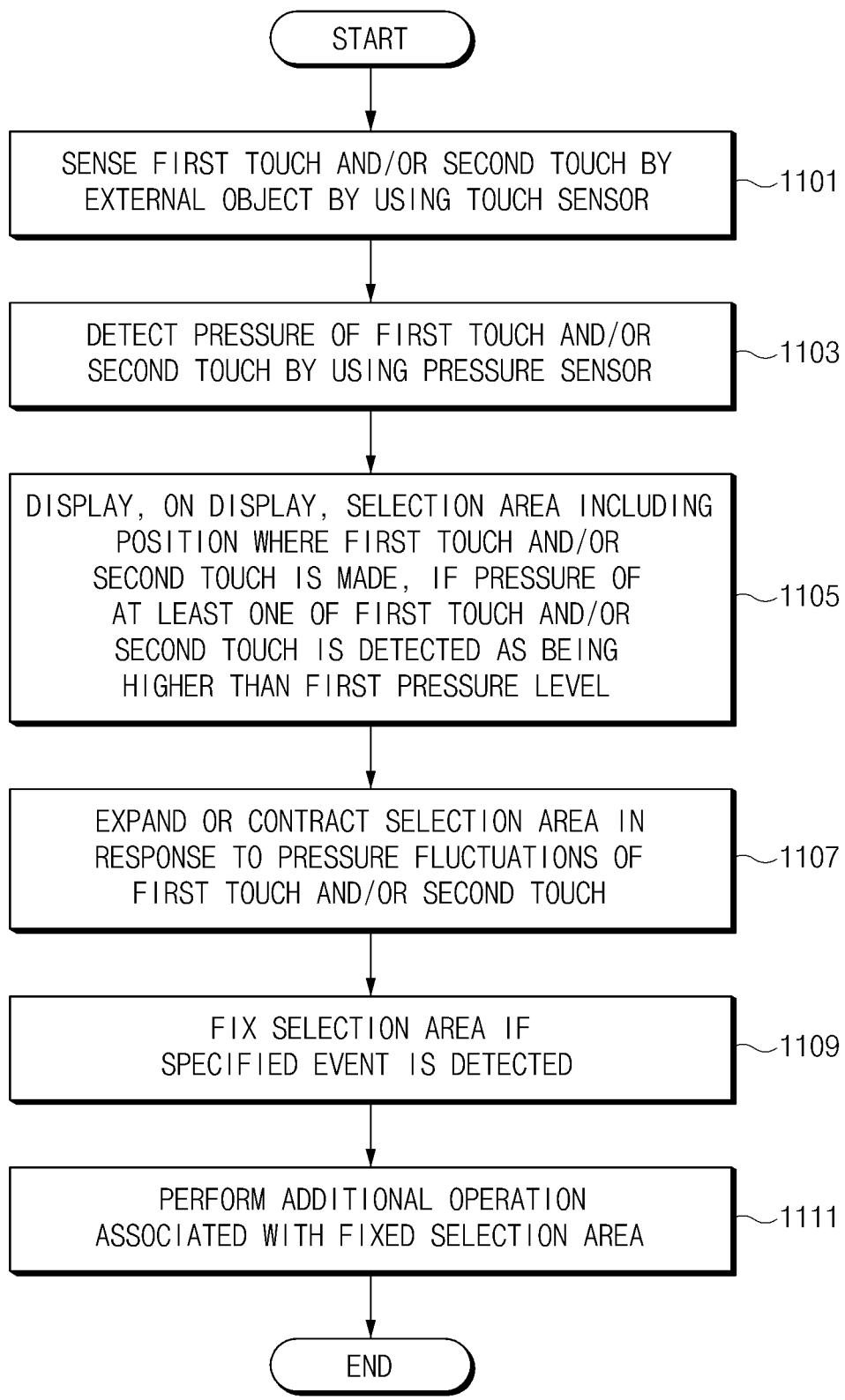
FIG. 11A and FIG. 11B illustrate a method for determining a selection area and using the determined selection area, according to an embodiment.

FIG. 11A illustrates a method for determining a selection area and using the determined selection area, according to an embodiment.

According to an embodiment, a method for determining a selection area and using the determined selection area may include operation 1101 to operation 1111 as illustrated in FIG. 11A. Operation 1101 to operation 1111 may be executed by, for example, the electronic device 701 illustrated in FIG. 7. Operation 1101 to operation 1111 may be respectively implemented with, for example, instructions that are capable of being performed (or executed) by at least one processor 760 of the electronic device 701. The instructions may be stored in, for example, computer-readable recording medium or the memory 750 of the electronic device 701 illustrated in FIG. 7.

Below, operation 1101 to operation 1111 will be described by using the reference numerals of FIG. 7. Operation 1101 to operation 1109 correspond to operation 802 to operation 810 of FIG. 8B, respectively, and a detailed description thereof is thus omitted.

In operation 1111, the at least one processor 760 of the electronic device 701 may perform an additional operation associated with an area that is fixed in operation 1109.

According to an embodiment, if the selection area is fixed, the processor 760 may enlarge the fixed selection area (content included in the fixed selection area) and may display the enlarged fixed selection area on the display 710. For example, the fixed selection area may be enlarged such that a boundary of the fixed selection area is along at least a portion of the periphery of the display 710.

According to another embodiment, the additional operation may correspond to an operation that is implemented by an application running in the electronic device 701. For example, in the case where the running application corresponds to an image viewer application, the additional operation may correspond to providing an edit tool object associated with part of an image included in the fixed area. For example, in the case where the running application corresponds to a map application, the additional operation may correspond to providing map content created by enlarging part of map content included in the fixed area. The additional operation is not limited to the above exemplification and includes operations of various applications capable of using a fixed selection area.

Figure 11B:
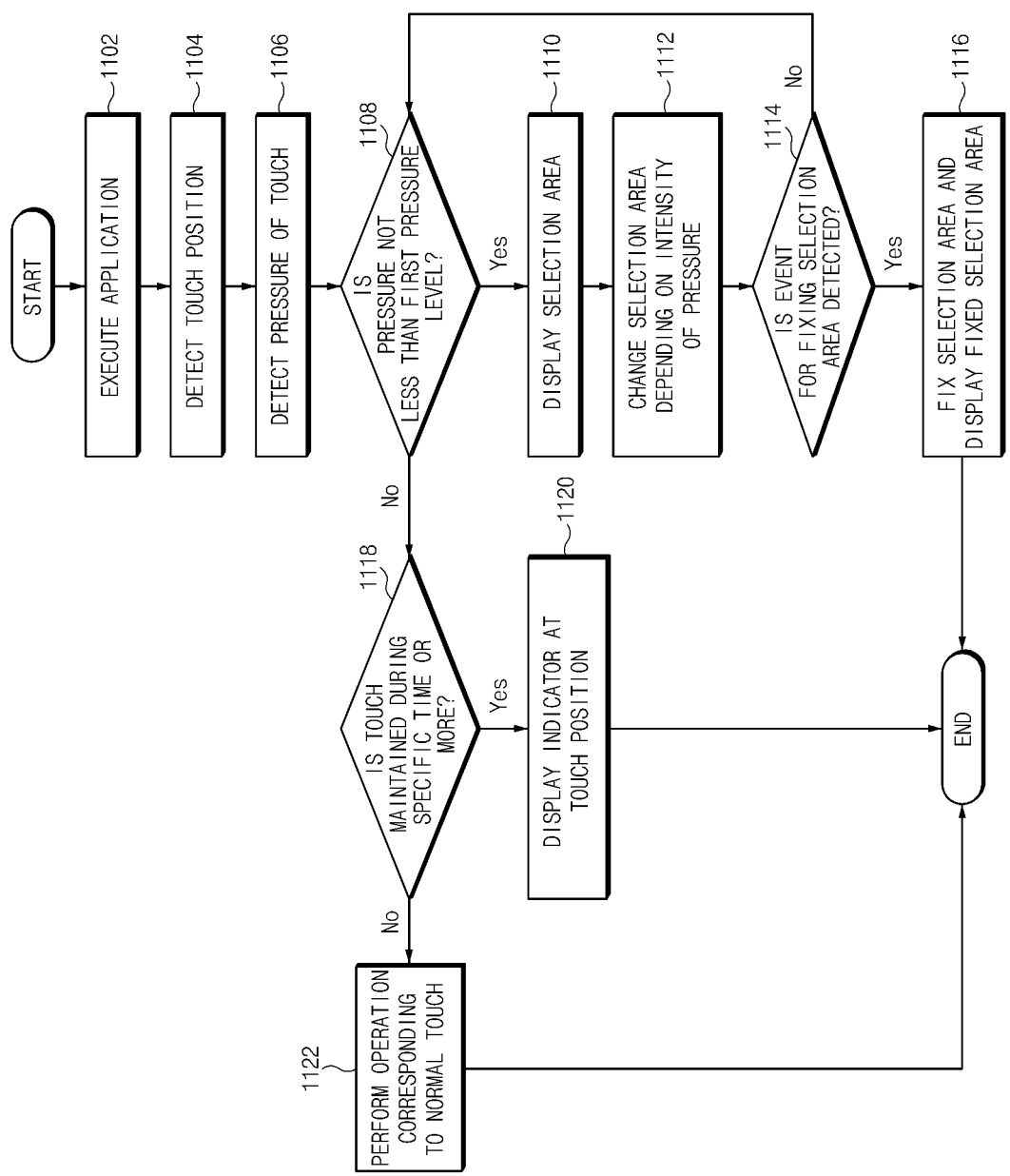

FIG. 11B illustrates a method for determining a selection area and using the determined selection area, according to another embodiment.

According to an embodiment, a method for determining a selection area and using the determined selection area may include operation 1102 to operation 1122 as illustrated in FIG. 11B. Operation 1102 to operation 1122 may be executed by, for example, the electronic device 701 illustrated in FIG. 7. Operation 1102 to operation 1122 may be respectively implemented with, for example, instructions that are capable of being performed (or executed) by the processor 760 of the electronic device 701. The instructions may be stored in, for example, a computer-readable recording medium or the memory 750 of the electronic device 701 illustrated in FIG. 7. Below, operation 1102 to operation 1122 will be described by using the reference numerals of FIG. 7.

In operation 1102, the at least one processor 760 of the electronic device 701 may execute (or launch) an application (e.g., an image viewer application, a multimedia play application, a map application, or the like). The at least one processor 760 may display one or more content on a user interface presented on the display 710 in response to the launching of the application.

In operation 1104, the at least one processor 760 may detect at least one touch by an external object (e.g., a finger of the user or an electronic pen) from the touch sensor 720 and may detect a position of the at least one touch.

In operation 1106, the at least one processor 760 may detect pressure of the at least one touch by using the pressure sensor 730.

In operation 1108, the at least one processor 760 may determine whether the pressure detected in operation 1106 is not less than (or exceeds) the first pressure level (e.g., P1 of FIG. 9). If the detected pressure is not less than the first pressure level, the at least one processor 760 may proceed to operation 1110; if not, the at least one processor 760 may proceed to operation 1118.

In operation 1110, the at least one processor 760 may display a graphical indication of a selection area in response to a touch, pressure of which is not less than the first pressure level, on the display 710. According to various embodiments, the at least one processor 760 may further display a graphical indication representing a position of the touch detected in operation 1104 on the display 710.

In operation 1112, the at least one processor 760 may change the selection area depending on the intensity of pressure that is detected in operation 1106 or is to be detected after operation 1106. That is, the at least one processor 760 may expand or contract the selection area in response to pressure fluctuations of the at least one touch.

In operation 1114, the at least one processor 760 may determine whether an event for fixing the selection area is detected. For example, the event may include an event that the expansion or contraction of the selection area stops during a specified time or more or an event that the selection area is reduced (rapidly) at a specified time change rate or more. If the event is detected, the at least one processor 760 may proceed to operation 1116; if not, the at least one processor 760 may proceed to operation 1108.

In operation 1116, the at least one processor 760 may fix the selection area in response to detecting the event and may display a graphical indication representing the fixed selection area on the display 710.

In operation 1118, the at least one processor 760 may determine whether a touch, pressure of which is less than (or not more than) the first pressure level, is maintained during a specific time or more. If the touch is maintained during the specific time or more, the at least one processor 760 may proceed to operation 1120; if not, the at least one processor 760 may proceed to operation 1122.

Since the touch, the pressure of which is less than (or not more than) the first pressure level, is maintained during the specific time or more, in operation 1120, the at least one processor 760 may determine the touch as a so-called "long touch" and may display a specified graphical indication at a position of the touch detected in operation 1104.

Since the touch, the pressure of which is less than (or not more than) the first pressure level, is not maintained during the specific time or more, in operation 1122, the at least one processor 760 may determine the touch as a "normal touch" (e.g., a tap)". The at least one processor 760 may perform an operation that is set in advance to correspond to the "normal touch".

Figure 12:
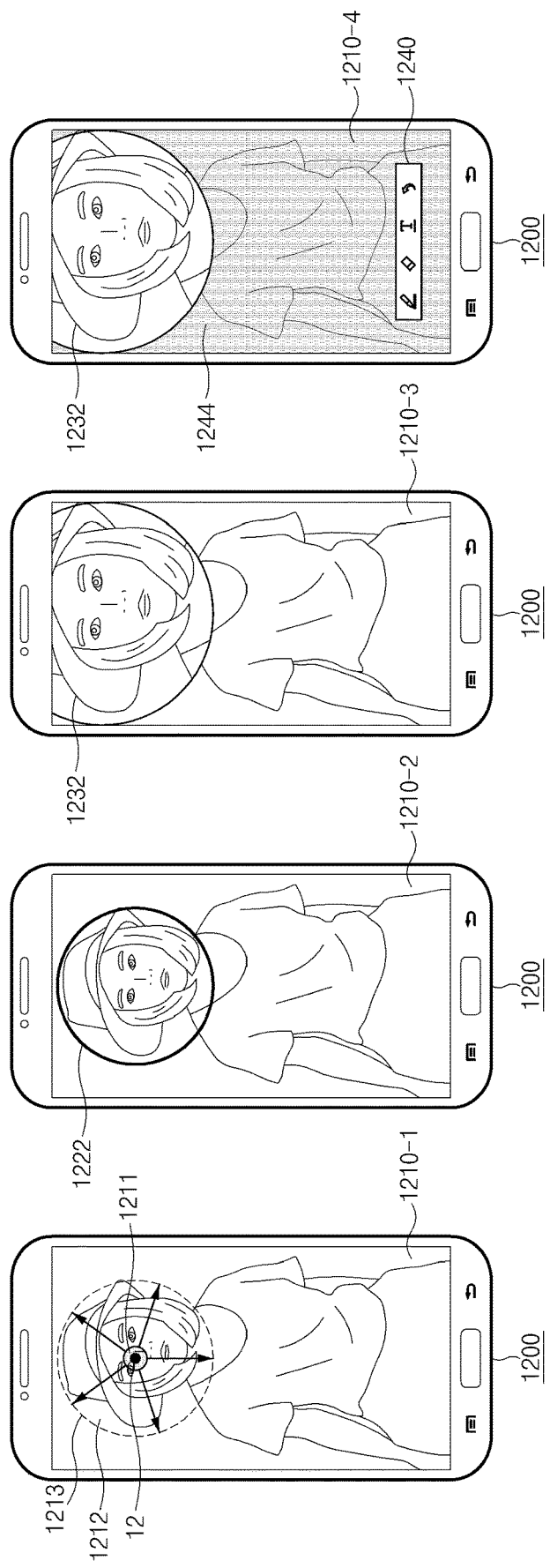
FIG. 12 is a view for describing a method for using a selection area, according to an embodiment.

FIG. 12 is a view for describing a method for using a selection area, according to an embodiment.

According to an embodiment, an electronic device 1200 that performs a method for using a selection area is illustrated in FIG. 12. For example, the electronic device 1200 may correspond to the electronic device 701 of FIG. 7.

According to an embodiment, the electronic device 1200 may execute an image viewer application (including an editing function). The electronic device 1200 may execute the image viewer application to display a user interface and/or content (e.g., an image included in a screen 1210-1) of the image viewer application in a display.

Referring to the screen 1210-1, the user may perform a touch 12 having predetermined pressure on the display. The electronic device 1200 may detect a position and pressure of the touch 12 in response to the touch 12. For example, the position of the touch 12 may correspond to a touch point 1211.

According to an embodiment, in the case where the pressure of the touch 12 is higher than the first pressure level (refer to P1 of FIG. 9), the electronic device 1200 may recognize the touch 12 as a "force touch". Since the electronic device 1200 recognizes the "force touch", the electronic device 1200 may display a selection area 1212 including a position (i.e., the touch point 1211) where the touch 12 is made, on the display.

The selection area 1212 may be surrounded by a circle 1213, a center of which is located at the position (i.e., the touch point 1211) where the touch 12 is made. According to one aspect, the selection area 1212 may correspond to an area where pressure by the touch 12 is detected as being higher than the second pressure level (refer to P2 of FIG. 9). According to an embodiment, the selection area 1212 and the circle 1213 surrounding the selection area 1212 may be expanded or contracted in response to pressure fluctuations of the touch 12.

Referring to a screen 1210-2, if a specified event is detected, the electronic device 1200 may fix the selection area as a selection area of a point in time when the specified event is detected. For example, if the specified event is detected, the electronic device 1200 may fix the selection area 1222. Part of an image may be specified by the fixed selection area 1222.

Referring to a screen 1210-3, the electronic device 1200 may enlarge the fixed selection area (an image included in the fixed selection area) 1222 and may display an enlarged selection area 1232 on the display. For example, a circumference of the enlarged selection area 1232 may border at least one side (e.g., a left-side boundary and a right-side boundary of the screen 1210-3) of the display. That is, the radius of 1222 can be increased to the distance between point 12 and a left or right periphery of the display.

Referring to a screen 1210-4, the electronic device 1200 may deactivate the remaining area (a so-called non-selection area) 1244 of the screen 1210-4 other than the enlarged selection area 1232. For example, the electronic device 1200 may deactivate a touch sensor, a display panel, an electronic pen sensor, etc. of a portion of the screen 1210-4 corresponding to the non-selection area 1244. Also, according to various embodiments, an image editing tool 1240 may be provided in the non-selection area 1244.

Figure 13A:
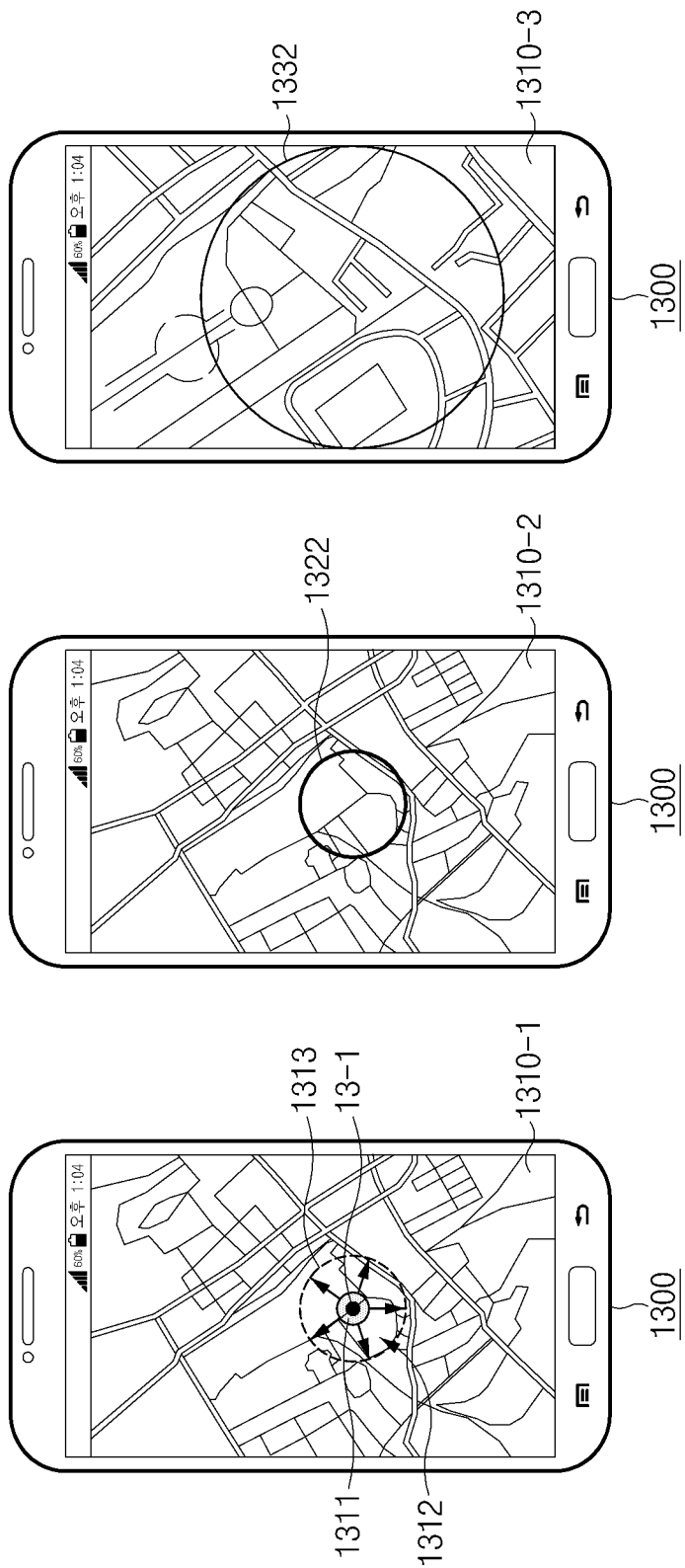
FIG. 13A and FIG. 13B are views for describing a method for using a selection area, according to another embodiment.
Figure 13B:
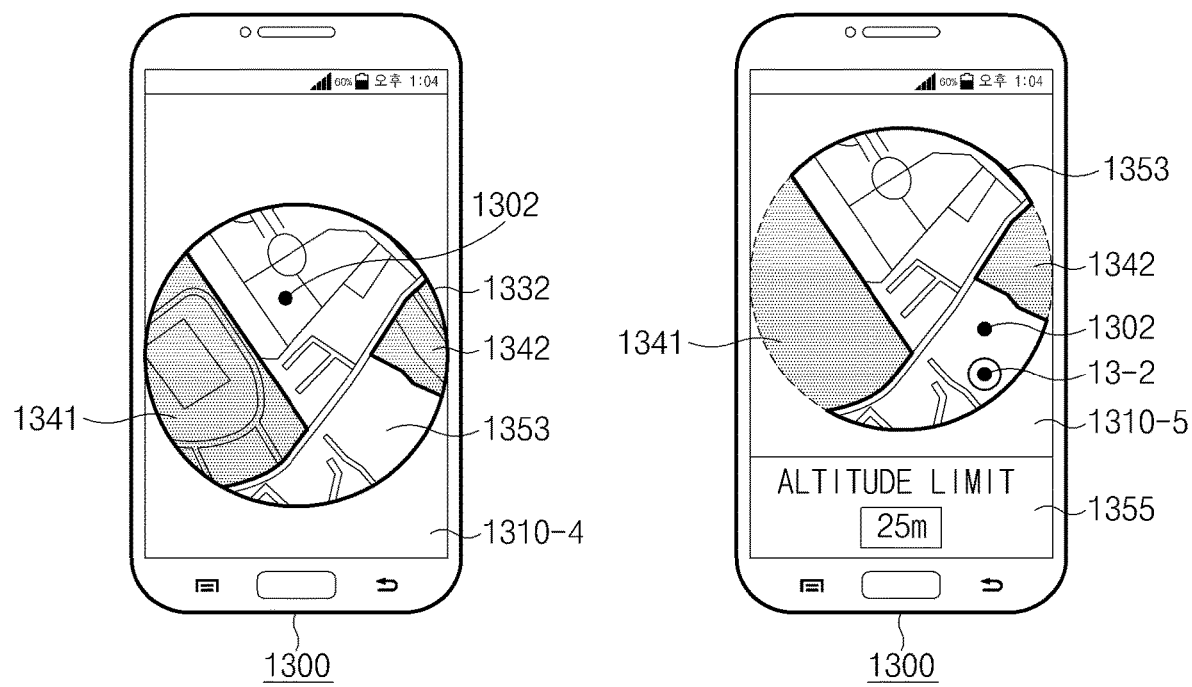

FIGS. 13A and 13B are views for describing a method for using a selection area, according to another embodiment.

According to an embodiment, an electronic device 1300 that performs a method for using a selection area is illustrated in FIG. 13A. For example, the electronic device 1300 may correspond to the electronic device 701 of FIG. 7. According to an embodiment, the electronic device 1300 may control an unmanned aerial vehicle or a driverless automobile (e.g., a drone: an example of the external electronic device 102 of FIG. 1) through a wireless communication network (e.g., the network 162 or the short range communication 164 of FIG. 1) by using a remote control application and a map application operated in conjunction with the remote control application.

According to an embodiment, the electronic device 1300 may execute the remote control application and the map application. For example, the electronic device 1300 may execute the map application to display a user interface and/or content (e.g., a map included in a screen 1310-1) of the map application in a display.

Referring to the screen 1310-1, the user may perform a touch 13-1 having predetermined pressure on the display. The electronic device 1300 may detect a position and pressure of the touch 13-1 in response to the touch 13-1. For example, the position of the touch 13-1 may correspond to a touch point 1311.

According to an embodiment, in the case where the pressure of the touch 13-1 is higher than the first pressure level (refer to P1 of FIG. 9), the electronic device 1300 may recognize the touch 13-1 as a "force touch". Since the electronic device 1300 recognizes the "force touch", the electronic device 1300 may display a selection area 1312 including a position (i.e., the touch point 1311) where the touch 13-1 is made, on the display.

According to one aspect, the selection area 1312 may correspond to an area surrounded by a circle 1313, a center of which is located at the position (i.e., touch point 1311) where the touch 13-1 is made. According to another aspect, the selection area 1312 may correspond to an area where pressure by the touch 13-1 is detected as being higher than the second pressure level (refer to P2 of FIG. 9). According to an embodiment, the selection area 1312 and the circle 1313 surrounding the selection area 1212 may be expanded or contracted in response to pressure fluctuations of the touch 13-1.

Referring to a screen 1310-2, if a specified event is detected, the electronic device 1300 may fix the selection area as a selection area of a point in time when the specified event is detected. For example, if the specified event is detected, the electronic device 1300 may fix the selection area 1322. Part of a map may be specified by the fixed selection area 1322.

Referring to a screen 1310-3, the electronic device 1300 may enlarge the fixed selection area (an image included in the fixed selection area) 1322 and may display the enlarged selection area 1332 on the display, effectively zooming in on the map. For example, a circumference of the enlarged selection area 1332 may border left and right sides (e.g., a left-side boundary and a right-side boundary of the screen 1310-3) of the display.

Referring to a screen 1310-4 of FIG. 13B, the electronic device 1300 may exclude areas, which are restricted in advance, from the selection area 1332 depending on settings of the remote control application. According to various embodiments, in the case where the restricted areas 1341 and 1342 exist in the selection area 1332, the electronic device 1300 may provide the user with a haptic feedback (e.g., vibration), an alarm message, alarm sound, or the like.

According to various embodiments of this disclosure, the restricted areas 1341 and 1342 may include an area occupied by buildings and the like and/or a flying restricted area (e.g., a military zone, a border, the vicinity of an airport or stadium, or the like), and the like. As such, a flyable area 1353 of the unmanned aerial vehicle 1302 that the electronic device 1300 operates may correspond to the remaining area of the selection area 1332 other than the restricted areas 1341 and 1342.

Referring to a screen 1310-5, the electronic device 1300 may display the flyable area 1353 of the unmanned aerial vehicle 1302 on the display.

According to various embodiments, the user may perform a touch 13-2, pressure of which is higher than the first pressure level, on the screen 1310-5 (e.g., in the flyable area 1353). The electronic device 1300 may display an object 1355 for limiting the flight altitude of the unmanned aerial vehicle 1302 in the screen 1310-5 in response to the touch 13-2. The electronic device 1300 may heighten or lower the flight restricted altitude in response to pressure fluctuations of the touch 13-2. In this case, hue, saturation, and value of the object 1355 may change according to the pressure fluctuations of the touch 13-2.

Figure 14A:
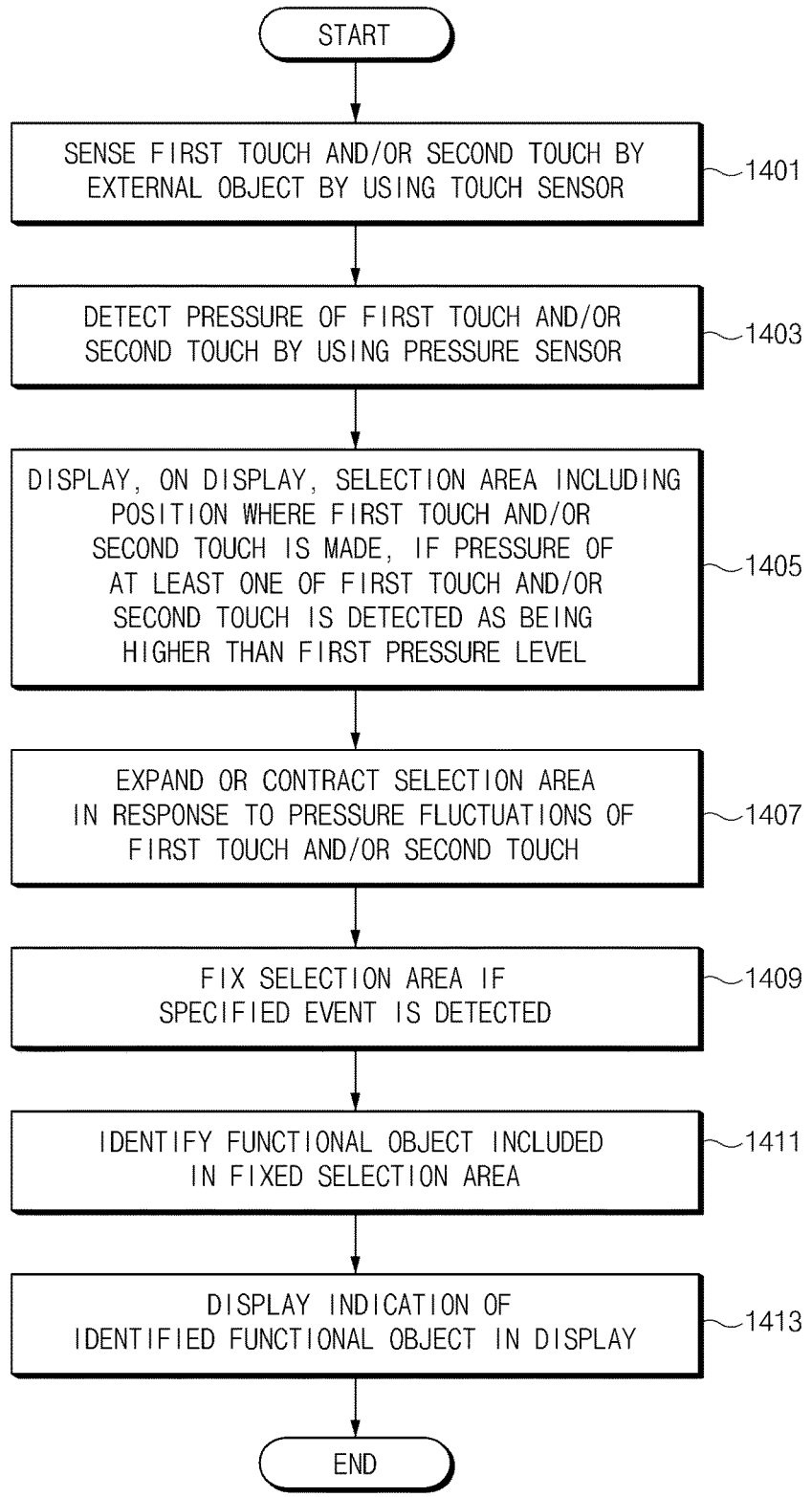
FIG. 14A and FIG. 14B illustrate a method for determining a selection area and displaying a functional object included in the determined selection area, according to an embodiment.

FIG. 14A illustrates a method for determining a selection area and displaying a functional object included in the determined selection area, according to an embodiment.

According to an embodiment, a method for determining a selection area and displaying a functional object included in the determined selection area may include operation 1401 to operation 1413 as illustrated in FIG. 14A. Operation 1401 to operation 1413 may be executed by, for example, the electronic device 701 illustrated in FIG. 7. Operation 1401 to operation 1413 may be respectively implemented with, for example, instructions that are capable of being performed (or executed) by the at least one processor 760 of the electronic device 701. The instructions may be stored in, for example, a computer-readable recording medium or the memory 750 of the electronic device 701 illustrated in FIG. 7.

Below, operation 1401 to operation 1413 will be described by using the reference numerals of FIG. 7. Operation 1401 to operation 1409 correspond to operation 802 to operation 820 of FIG. 8B, respectively, and a detailed description thereof is thus omitted.

In operation 1411, the at least one processor 760 of the electronic device 701 may identify a functional object included in the selection area fixed in operation 1409. For example, the at least one processor 760 may identify the functional object included in the fixed selection area based on a set algorithm of an application.

According to various embodiments of this disclosure, in the case where an image viewer application for viewing an image is being executed, the at least one processor 760 may identify an image object (e.g., a face object) included in the fixed selection area on the viewed image, based on an image object recognition algorithm (e.g., a face recognition algorithm or the like).

For another example, in the case where a map application (e.g., Google Maps™) for providing map content is being executed, on the basis of a search query (e.g., a gas station, a bank, ATM, a restaurant, a park, a café, or the like) input by the user, the at least one processor 760 may specify a functional object corresponding to the search query in the fixed selection area.

In operation 1413, the at least one processor 760 may display a graphical indication of the specified functional object in the fixed selection area through the display 710.

Figure 14B:
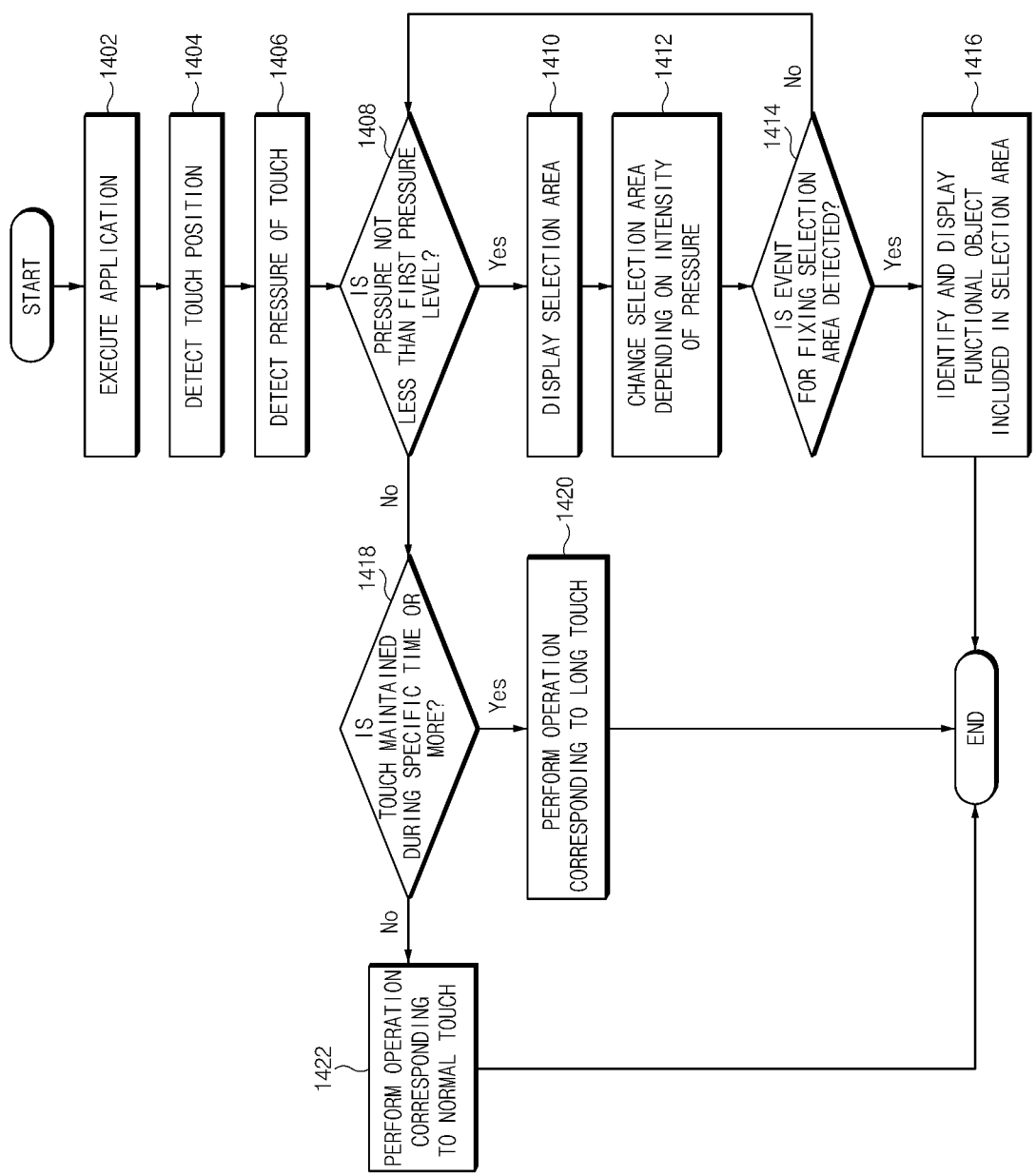

FIG. 14B illustrates a method for determining a selection area and displaying a functional object included in the determined selection area, according to another embodiment.

According to an embodiment, a method for determining a selection area and displaying a functional object included in the determined selection area may include operation 1402 to operation 1422 as illustrated in FIG. 14B. Operation 1402 to operation 1422 may be executed by, for example, the electronic device 701 illustrated in FIG. 7. Operation 1402 to operation 1422 may be respectively implemented with, for example, instructions that are capable of being performed (or executed) by the at least one processor 760 of the electronic device 701. The instructions may be stored in, for example, a computer-readable recording medium or the memory 750 of the electronic device 701 illustrated in FIG. 7. Below, operation 1402 to operation 1422 will be described by using the reference numerals of FIG. 7.

In operation 1402, the at least one processor 760 of the electronic device 701 may execute (or launch) an application (e.g., an image viewer application, a multimedia play application, a map application, or the like). The at least one processor 760 may display one or more content on a user interface presented on the display 710 in response to the launching of the application.

In operation 1404, the at least one processor 760 may detect at least one touch by an external object (e.g., a finger of the user or an electronic pen) by using the touch sensor 720 and may detect a position of the at least one touch.

In operation 1406, the at least one processor 760 may detect pressure of the at least one touch by using the pressure sensor 730.

In operation 1408, the at least one processor 760 may determine whether the pressure detected in operation 1406 is not less than (or exceeds) the first pressure level (e.g., P1 of FIG. 9). If the detected pressure is not less than the first pressure level, the at least one processor 760 may proceed to operation 1410; if not, the at least one processor 760 may proceed to operation 1418.

In operation 1410, the at least one processor 760 may display a graphical indication of a selection area in response to a touch, pressure of which is not less than the first pressure level, on the display 710. According to various embodiments, the at least one processor 760 may further display a graphical indication representing a position of the touch detected in operation 1404 on the display 710.

In operation 1412, the at least one processor 760 may change a selection area depending on the intensity of pressure that is detected in operation 1406 or is to be detected after operation 1406. That is, the at least one processor 760 may expand or contract the selection area in response to pressure fluctuations of the at least one touch.

In operation 1414, the at least one processor 760 may determine whether an event for fixing the selection area is detected. For example, the event may include an event that the expansion or contraction of the selection area stops during a specified time or more or an event that the selection area is reduced (rapidly) at a specified time change rate or more. If the event is detected, the at least one processor 760 may proceed to operation 1416; if not, the at least one processor 760 may proceed to operation 1408.

In operation 1416, the at least one processor 760 may fix the selection area in response to detecting the event and may identify and display a functional object included in the fixed selection area. For example, the at least one processor 760 may identify the functional object included in the fixed selection area based on settings of the application running in operation 1402.

In operation 1418, the at least one processor 760 may determine whether a touch, pressure of which is less than (or not more than) the first pressure level, is maintained during a specific time or more. If the touch is maintained during the specific time or more, the at least one processor 760 may proceed to operation 1420; if not, the at least one processor 760 may proceed to operation 1422.

Since the touch, the pressure of which is less than (or not more than) the first pressure level, is maintained during the specific time or more, in operation 1420, the at least one processor 760 may determine the touch as a so-called "long touch" and may perform an operation that is set in advance to correspond to the "long touch".

Since the touch, the pressure of which is less than (or not more than) the first pressure level, is not maintained during the specific time or more, in operation 1422, the at least one processor 760 may determine the touch as a "normal touch (or tap)". The at least one processor 760 may perform an operation that is set in advance to correspond to the "normal touch".

Figure 15:
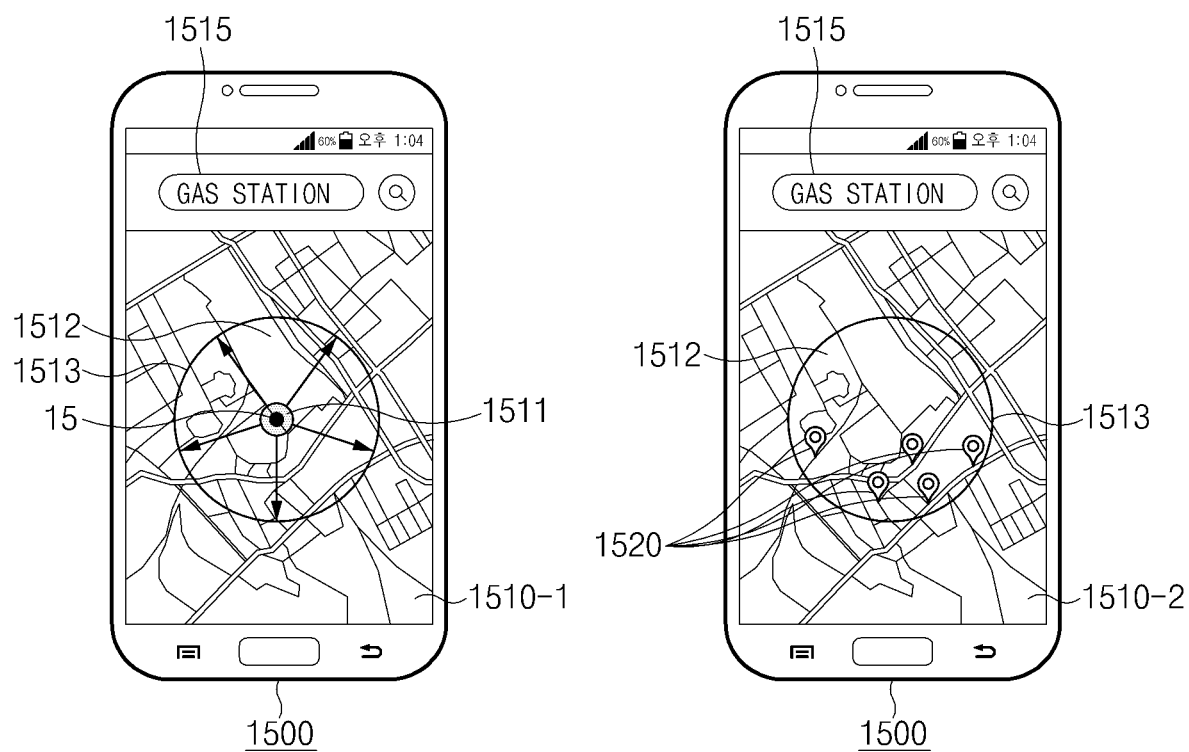
FIG. 15 is a view for describing a method for displaying a functional object included in a selection area, according to an embodiment.

FIG. 15 is a view for describing a method for displaying a functional object included in a selection area, according to an embodiment.

According to an embodiment, an electronic device 1500 that performs a method for displaying a functional object included in a selection area is illustrated in FIG. 15. For example, the electronic device 1500 may correspond to the electronic device 701 of FIG. 7. According to an embodiment, the electronic device 1500 may execute a map application that is operable in conjunction with the Internet. For example, the electronic device 1500 may execute the map application to display a user interface and/or map content (e.g., a map included in a screen 1510-1) of the map viewer application in a display.

Referring to the screen 1510-1, the user may input a search query (e.g., "GAS STATION") in a search field 1515. The search query is an example and may include various keywords (or voice inputs) such as a bank, an ATM, a restaurant, a park, a café, and the like.

After inputting the search query in the search field 1515, the user may perform a touch 15 having predetermined pressure on a display (or the screen 1510-1). The electronic device 1500 may detect a position and pressure of the touch 15 in response to the touch 15. For example, the position of the touch 15 may correspond to a touch point 1511.

According to an embodiment, in the case where the pressure of the touch 15 is higher than the first pressure level (refer to P1 of FIG. 9), the electronic device 1500 may display a selection area 1512 including a position (i.e., the touch point 1511) where the touch 15 is made.

The selection area 1512 may correspond to an area surrounded by a circle 1513, a center of which is located at the position (i.e., the touch point 1511) where the touch 15 is made. According to one aspect, the selection area 1512 may correspond to an area where pressure by the touch 15 is detected as being higher than the second pressure level (refer to P2 of FIG. 9). According to an embodiment, the selection area 1512 and the circle 1513 surrounding the selection area 1512 may be expanded or contracted in response to pressure fluctuations of the touch 15.

Referring to a screen 1510-2, if a specified event is detected, the electronic device 1500 may fix the selection area 1512. Next, the electronic device 1500 may specify a functional object (e.g., a functional object representing a gas station) corresponding to the search query in the fixed selection area 1512, based on the search query (e.g., "GAS STATION"). The processor 1500 may display a graphical indication 1520 of the specified functional object on the screen 1510-2.

In certain embodiments, after typing the search entry "Gas Station" into the search field 1515, fixing selection area 1512 can also result in entry of "Gas Station" as a search entry. That is, the user can search for "Gas Station" without having to select the magnifying glass or pressing an enter key. Rather, upon fixing selection area 1512, the contents of the search field 1515 are entered for search.

Figure 16:
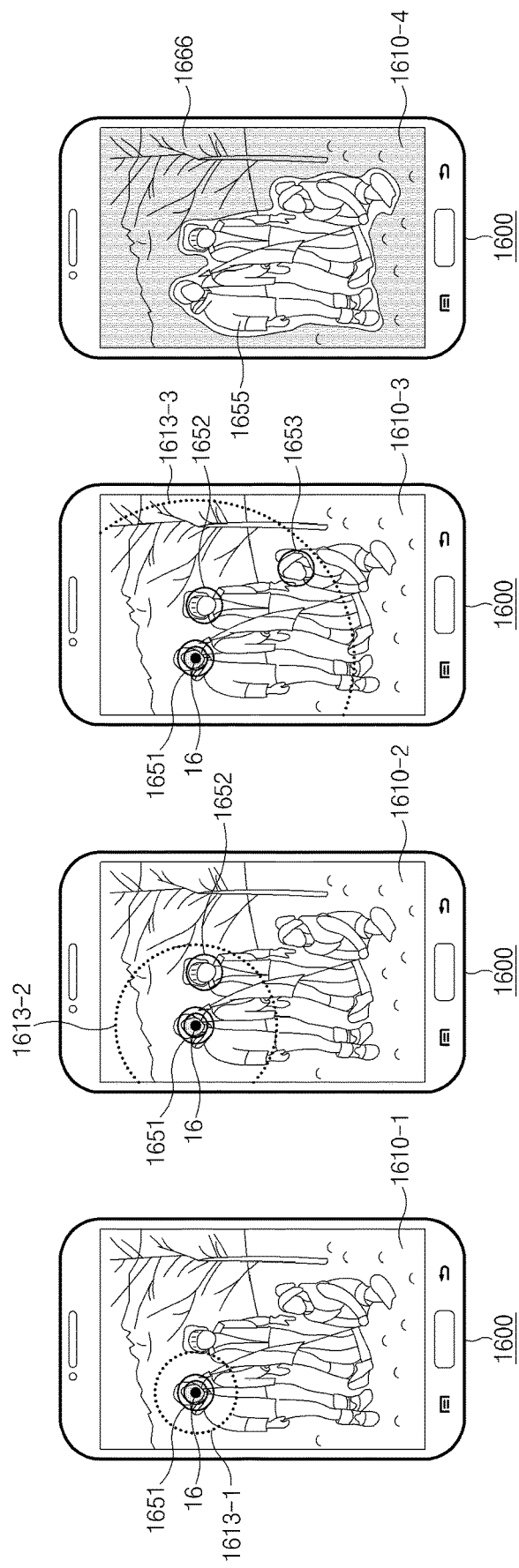
FIG. 16 is a view for describing a method for displaying a functional object included in a selection area, according to an embodiment.

FIG. 16 is a view for describing a method for displaying a functional object included in a selection area, according to an embodiment.

According to an embodiment, an electronic device 1600 that performs a method for displaying a functional object included in a selection area is illustrated in FIG. 16. For example, the electronic device 1600 may correspond to the electronic device 701 of FIG. 7. According to an embodiment, the electronic device 1600 may execute an image viewer application (including an editing function). For example, the electronic device 1600 may execute the image viewer application to display a user interface and/or content (e.g., an image included in a screen 1610-1) of the image viewer application in a display.

Referring to the screen 1610-1, the user may perform a touch 16 having predetermined pressure on the display (or the screen 1610-1). The electronic device 1600 may detect a position and pressure of the touch 16 in response to the touch 16.

According to an embodiment, in the case where the pressure of the touch 16 is higher than the first pressure level (refer to P1 of FIG. 9), the electronic device 1600 may display a selection area 1613-1 including a position where the touch 16 is made, in a display.

According to an embodiment, the electronic device 1600 may identify an image object (e.g., a face object) included in the selection area 1613-1 based on an image object recognition algorithm (e.g., a face recognition algorithm) and may display a graphical indication 1651 (e.g., a small circle) of the image object.

The electronic device 1600 may expand or contract the selection area 1613-1 in response to pressure fluctuations of the touch 16. In this regard, referring to a screen 1610-2, if the electronic device 1600 detects an increase in the pressure of the touch 16, the electronic device 1610 may expand the selection area 1613-1. As such, the selection area 1613-1 may turn into a selection area 1613-2. Also, the electronic device 1600 may additionally identify another image object (e.g., a face object) included in the expanded selection area 1613-2 based on an image object recognition algorithm (e.g., a face recognition algorithm) and may display a graphical indication 1652 (e.g., a small circle) of the image object.

As in the above description, referring to a screen 1610-3, if the electronic device 1600 detects an additional increase in the pressure of the touch 16, the electronic device 1610 may expand the selection area 1613-2. As such, the selection area 1613-2 may turn into a selection area 1613-3. Also, the electronic device 1600 may further identify an image object included in the additionally expanded selection area 1613-3 based on an image object recognition algorithm (e.g., a face recognition algorithm) and may display a graphical indication 1653 (e.g., a small circle) of the image object.

Afterwards, if a specified event is detected, the electronic device 1600 may fix the selection area 1613-3.

Referring to a screen 1610-4, the electronic device 1600 may select an area 1655 associated with image objects 1651, 1652, and 1653. In this case, the electronic device 1600 may deactivate the remaining area (a so-called non-selection area) 1666 of the screen 1610-4 other than the selected area 1655. For example, the electronic device 1600 may deactivate a touch sensor, a display panel, an electronic pen sensor, etc. of a portion corresponding to the non-selection area 1666. Also, according to various embodiments, an image editing tool (not illustrated) may be provided in the non-selection area 1666.

According to various embodiments of this disclosure, it may be possible to provide users with more intuitive user experience by setting a selection area depending on pressure of a touch and applying the selection area to various applications.

According to an embodiment, a method for determining a selection area may include launching an application program displaying a user interface, displaying at least one content on the user interface, receiving data on a position of an external object pressing the display and data on pressure, determining a primary position and/or a secondary position on the content based at least partly on the data on the position of the external object, determining a selection region including the primary position and/or the secondary position based at least partly on the data on the pressure by the external object, and displaying the selection region and an indication of the primary position and/or the second position, on the display.

According to an embodiment, a method for determining a selection area may include sensing a first touch by an external object by using a touch sensor, detecting pressure of the first touch by using a pressure sensor, displaying, in a display, a selection area including a position where the first touch is made, if the pressure of the first touch is detected as being higher than a first pressure level, expanding or contracting the selection area in response to pressure fluctuations of the first touch, and fixing the selection area if the expansion or contraction of the selection area stops during a specified time or more or if the selection are is contracted at a specified time change rate or more.

According to another embodiment, the method may further include sensing a second touch by another external object by using the touch sensor, detecting pressure of the second touch by using the pressure sensor, and displaying, on the display, a selection area including a position where the first touch is made and a position where the second touch is made, if pressure of at least one of the first touch or the second touch is detected as being higher than a first pressure level.

According to an embodiment, a computer-readable recording medium may store instructions that, when executed by at least one processor, cause the processor to launch an application program displaying a user interface, to display at least one content on the user interface, to receive data on a position of an external object pressing the display and data on pressure, to determine a primary position and/or a secondary position on the content based at least partly on the data on the position of the external object, to determine a selection region including the primary position and/or the secondary position based at least partly on the data on the pressure by the external object, and to display the selection region and an indication of the primary position and/or the second position, on the display.

According to an embodiment, a computer-readable recording medium may store instructions that, when executed by at least one processor, cause the processor to sense a first touch by an external object by using a touch sensor, to detect pressure of the first touch by using a pressure sensor, to display, in a display, a selection area including a position where the first touch is made, if the pressure of the first touch is detected as being higher than a first pressure level, to expand or contract the selection area in response to pressure fluctuations of the first touch, and to fix the selection area if the expansion or contraction of the selection area stops during a specified time or more or if the selection are is contracted at a specified time change rate or more.

According to another embodiment, the instructions may further include an instruction that causes the processor to sense a second touch by another external object by using the touch sensor, to detect pressure of the second touch by using the pressure sensor, and to display, on the display, a selection area including the position where the first touch is made and a position where the second touch is made, if pressure of at least one of the first touch or the second touch is detected as being higher than the first pressure level.

The term "module" used in this disclosure may represent, for example, a unit including hardware, or a combination of hardware and software stored therein. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to various embodiments of this disclosure, it may be possible to provide users with more intuitive user experience by setting a selection area depending on pressure of a touch and applying the selection area to various applications. Besides, a variety of effects directly or indirectly understood through this disclosure may be provided.

While this disclosure has been shown and described with reference to various embodiments thereof, it will be understood by those skilled in the art that various changes in form and details may be made therein without departing from the spirit and scope of this disclosure as defined by the appended claims and their equivalents.

What is claimed is:

1. An electronic device comprising:
 a display;
 a touch sensor configured to detect at least one position of a touch by an external object on the display;
 a pressure sensor configured to detect pressure by the external object against the display;
 at least one processor electrically connected with the display, the touch sensor, and the pressure sensor; and
 a memory electrically connected with the processor,
 wherein the memory stores a plurality of executable instructions, when executed, cause the at least one processor to:
 present a user interface containing content on the display;
 receive, from the touch sensor and the pressure sensor, data including the position coordinates of a first touch in which the external object pushes the display and data including the pressure of the first touch in which of the external object presses against the display;
 determine a primary position on the content based at least in part on the position of the touch;
 detect a second touch by another external object from the touch sensor;
 detect pressure of the second touch from the pressure sensor;
 determine a selection area on the content that includes the primary position, based at least in part on the pressure;
 display an indication of the selection area over the content;
 output, on the display, the selection area including both the position where the first touch is made and a position where the second touch is made, when the pressure of the first touch and the pressure of the second touch is higher than a first pressure level; and
 perform an additional operation associated with the selection area, wherein the first touch and the second touch are performed while the selection area is being determined,
wherein if a specified event is detected, the selection area is fixed at a time of the specified event, and
wherein the specified event includes:
a fluctuation of expansion or contraction of the selection area being less than a predetermined amount during a specified time, and
a contraction rate of the selection area exceeding predetermined rate.

2. The electronic device of claim 1, wherein the instructions further include instructions that causes the at least one processor to:
determine a secondary position on the content, based at least in part on the position; and
determine the selection area of the content that includes the primary position and the secondary position, based at least in part on the pressure.

3. The electronic device of claim 1, wherein the content includes a map or an image.

4. The electronic device of claim 1, wherein the indication of the selection area includes a first graphical indication representing the primary position, and a second graphical indication representing a boundary of the selection area.

5. An electronic device comprising:
a display;
a touch sensor;
a pressure sensor;
at least one processor electrically connected with the display, the touch sensor, and the pressure sensor; and
a memory electrically connected with the at least one processor,
wherein the memory stores instructions that, when executed, cause the processor to:
detect a first touch by an external object from the touch sensor;
detect pressure of the first touch from the pressure sensor;
detect a second touch by another external object from the touch sensor;
detect pressure of the second touch from the pressure sensor;
output, on the display, a selection area including a position where the first touch is made, when the pressure of the first touch is detected as being higher than a first pressure level;
expand or contract the selection area in response to pressure fluctuation of the first touch;
fix the selection area when a specified event is detected;
output, on the display, the selection area including both the position where the first touch is made and a position where the second touch is made, when the pressure of the first touch and the pressure of the second touch is higher than the first pressure level; and
perform an additional operation associated with the fixed selection area,
wherein the first touch and the second touch are performed while the selection area is being determined,
wherein the selection area is fixed at a time of the specified event, and
wherein the specified event includes:
a fluctuation of expansion or contraction of the selection area being less than a predetermined amount during a specified time, and
a contraction rate of the selection area exceeding predetermined rate.

6. The electronic device of claim 5, wherein the memory further stores instructions that, when executed, cause the processor to deactivate a remaining area other than the selection area.

7. The electronic device of claim 5, wherein the selection area corresponds to an area surrounded by a closed curve, enclosing the position where the first touch is made.

8. The electronic device of claim 5, wherein the selection area includes an area where pressure by the first touch is detected as being higher than a second pressure level,
wherein the second pressure level is lower than the first pressure level.

9. The electronic device of claim 5, wherein
a closed curve surrounding the selection area is inscribed at least one point with a boundary of an area where pressure of the first touch and pressure of the second touch are detected as being higher than a second pressure level,
wherein the second pressure level is lower than the first pressure level.

10. The electronic device of claim 5, wherein a closed curve surrounding the selection area forms at least one of a circle, an ellipse, and a polygon.

11. The electronic device of claim 5, wherein the instructions further include instructions that cause the processor to:
exclude a restricted area from the selection area.

12. The electronic device of claim 5, wherein the instructions further include instructions that cause the processor to:
enlarge the fixed selection area and output the enlarged selection area on the display.

13. The electronic device of claim 12, wherein the instructions further include instructions that cause the processor to:
enlarge the fixed selection area such that a boundary of the fixed selection area includes at least a portion of a periphery of the display.

14. The electronic device of claim 5, wherein the instructions further include instructions that cause the processor to:
identify a functional object included in the fixed selection area; and
display an indication of the identified functional object on the display.

15. The electronic device of claim 14, wherein the instructions further include instructions that cause the processor to:
specify the functional object based on a search query input from a user.

16. The electronic device of claim 14, wherein the instructions further include instructions that cause the processor to:
specify the functional object based on a specified criteria.

17. A non-transitory computer-readable recording medium storing instructions that, when executed by at least one processor, cause the at least one processor to:
detect a first touch by an external object from a touch sensor;
detect pressure of the first touch from a pressure sensor;
detect a second touch by another external object from the touch sensor;
detect pressure of the second touch from the pressure sensor;
display, on a display, a selection area including a position where the first touch is made, when the pressure of the first touch is detected as being higher than a first pressure level;
expand or contract the selection area in response to pressure fluctuations of the first touch;
fix the selection area when a specified event is detected;
display, on the display, the selection area including both the position where the first touch is made and a position where the second touch is made, if either the pressure of the first touch or the pressure of the second touch is higher than the first pressure level; and perform an additional operation associated with the fixed selection area, wherein the first touch and the second touch are performed while the selection area is being determined, wherein the selection area is fixed at a time of the specified event, and wherein the specified event includes:

a fluctuation of expansion or contraction of the selection area being less than a predetermined amount during a specified time, and a contraction rate of the selection area exceeding predetermined rate.

* * * * *